United States Patent
Havel et al.

(10) Patent No.: US 12,522,434 B2
(45) Date of Patent: Jan. 13, 2026

(54) STABILITY OF A LOAD HANDLING DEVICE IN A STORAGE SYSTEM

(71) Applicant: Ocado Innovation Limited, Hatfield (GB)

(72) Inventors: Marek Havel, Hatfield (GB); Matthew Harman, Hatfield (GB); Hamza Ellahi, Hatfield (GB); Negar Khosroshahli, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 769 days.

(21) Appl. No.: 17/759,331

(22) PCT Filed: Jan. 22, 2021

(86) PCT No.: PCT/EP2021/051469
§ 371 (c)(1),
(2) Date: Jul. 22, 2022

(87) PCT Pub. No.: WO2021/148612
PCT Pub. Date: Jul. 29, 2021

(65) Prior Publication Data
US 2023/0077808 A1 Mar. 16, 2023

(30) Foreign Application Priority Data

Jan. 24, 2020 (GB) ........................ 2001012
Mar. 4, 2020 (GB) ........................ 2003101
Oct. 30, 2020 (GB) ........................ 2017257

(51) Int. Cl.
*B65G 1/04* (2006.01)
*B60L 58/26* (2019.01)
(Continued)

(52) U.S. Cl.
CPC ............ *B65G 1/0464* (2013.01); *B60L 58/26* (2019.02); *B60R 16/04* (2013.01); *B65G 1/0478* (2013.01);
(Continued)

(58) Field of Classification Search
CPC .... B65G 1/0464; B65G 1/0478; B65G 1/065; B65G 2201/0235; B65G 1/0492;
(Continued)

(56) References Cited

U.S. PATENT DOCUMENTS 9,334,114 B2  5/2016  Salichs et al.
9,643,780 B2  5/2017  Salichs et al.
(Continued)

FOREIGN PATENT DOCUMENTS

CA  3063302 A1  11/2018
CA  3095483 A1  10/2019
(Continued)

OTHER PUBLICATIONS

Office Action issued on Oct. 3, 2023, by the Canadian Patent Office in corresponding Canadian Patent Application No. 3,168,846. (10 pages).
(Continued)

*Primary Examiner* — Michael Collins
(74) *Attorney, Agent, or Firm* — Buchanan Ingersoll & Rooney PC

(57) ABSTRACT

A load handling device for lifting and moving one or more containers stacked in a storage system with a grid framework structure supporting a plurality of tracks arranged in a grid pattern, the load handling device comprising: A) a driving mechanism; and B) a vehicle body having a footprint that occupies a single grid cell in the storage system, the vehicle body housing including:
i) a rechargeable power source;
(Continued)

ii) a first space configured for accommodating a container and the rechargeable power source is housed in a second space; and iii) a lifting device to releasably grip a container and lift the container from the stack into the first space, wherein the rechargeable power source is arranged above the first space such that the center of mass of the load handling device is in the second space.

19 Claims, 14 Drawing Sheets

(51) Int. Cl.

| | | |
|---|---|---|
| *B60R 16/04* | (2006.01) | |
| *B65G 1/06* | (2006.01) | |
| *B66C 19/00* | (2006.01) | |
| *H01M 10/613* | (2014.01) | |
| *H01M 10/625* | (2014.01) | |
| *H01M 10/6551* | (2014.01) | |
| *H01M 10/6563* | (2014.01) | |
| *H01M 10/6572* | (2014.01) | |

(52) U.S. Cl.
CPC .............. *B65G 1/065* (2013.01); *B66C 19/00* (2013.01); *H01M 10/613* (2015.04); *H01M 10/625* (2015.04); *H01M 10/6551* (2015.04); *H01M 10/6563* (2015.04); *H01M 10/6572* (2015.04); *B65G 2201/0235* (2013.01)

(58) Field of Classification Search
CPC ...... B65G 1/04; B65G 1/0485; B65G 1/1373; B60L 58/26; B60L 50/60; B60R 16/04; B66C 19/00; H01M 10/613; H01M 10/625; H01M 10/6551; H01M 10/6563; H01M 10/6572; B65D 25/02; B65D 81/263; B65D 85/50; Y02T 90/12

See application file for complete search history.

(56) References Cited

U.S. PATENT DOCUMENTS

| | | | |
|---|---|---|---|
| 9,643,781 B2 | 5/2017 | Salichs et al. | |
| 9,850,066 B2 | 12/2017 | Salichs et al. | |
| 10,294,025 B2 | 5/2019 | Hognaland et al. | |
| 10,526,143 B2 | 1/2020 | Salichs et al. | |
| 10,807,796 B2 | 10/2020 | Hognaland et al. | |
| 10,882,694 B2 | 1/2021 | Hognaland et al. | |
| 10,961,054 B2 | 3/2021 | Gravelle et al. | |
| 10,974,898 B2 | 4/2021 | Salichs et al. | |
| 11,008,166 B2 | 5/2021 | Gravelle et al. | |
| 11,492,198 B2 | 11/2022 | Salichs et al. | |
| 2013/0129453 A1 | 5/2013 | Salichs et al. | |
| 2013/0129454 A1 | 5/2013 | Salichs et al. | |
| 2013/0129456 A1* | 5/2013 | Salichs ................. | B65G 1/065 414/277 |
| 2013/0129469 A1 | 5/2013 | Salichs et al. | |
| 2016/0194151 A1* | 7/2016 | Lindbo ................ | G06Q 10/087 |
| 2017/0129702 A1 | 5/2017 | Hognaland | |
| 2018/0170672 A1 | 6/2018 | Salichs et al. | |
| 2018/0178980 A1 | 6/2018 | Lindbo et al. | |
| 2018/0178981 A1 | 6/2018 | Lindbo et al. | |
| 2018/0244468 A1 | 8/2018 | Hognaland et al. | |
| 2018/0257860 A1 | 9/2018 | Hognaland et al. | |
| 2019/0375589 A1 | 12/2019 | Gravelle et al. | |
| 2019/0375590 A1 | 12/2019 | Gravelle et al. | |
| 2020/0148474 A1 | 5/2020 | Salichs et al. | |
| 2020/0307908 A1 | 10/2020 | Lindbo et al. | |
| 2021/0047111 A1 | 2/2021 | Lindbo et al. | |
| 2021/0078802 A1 | 3/2021 | Hognaland et al. | |
| 2021/0086992 A1 | 3/2021 | Lindbo et al. | |
| 2021/0086993 A1 | 3/2021 | Lindbo et al. | |
| 2021/0198039 A1 | 7/2021 | Salichs et al. | |
| 2021/0354922 A1 | 11/2021 | Gravelle et al. | |
| 2021/0403237 A1* | 12/2021 | Austrheim ............. | B66C 13/00 |
| 2023/0025507 A1* | 1/2023 | Austrheim ................. | B25J 5/02 |
| 2023/0048281 A1 | 2/2023 | Salichs et al. | |
| 2023/0116593 A1* | 4/2023 | Corser ................. | B65G 1/0478 180/68.5 |

FOREIGN PATENT DOCUMENTS

| | | |
|---|---|---|
| CN | 104066661 A | 9/2014 |
| CN | 205708400 U | 11/2016 |
| CN | 106660703 A | 5/2017 |
| CN | 107067206 A | 8/2017 |
| CN | 109018796 A | 12/2018 |
| CN | 109454969 A | 3/2019 |
| CN | 110065750 A | 7/2019 |
| EP | 2613399 A2 | 7/2013 |
| JP | 2016529181 A | 9/2016 |
| KR | 20160040690 A | 4/2016 |
| WO | 2015019055 A1 | 2/2015 |
| WO | 2015185628 A2 | 12/2015 |
| WO | 2015193278 A1 | 12/2015 |
| WO | 2018053705 A1 | 3/2018 |
| WO | 2018073392 A1 | 4/2018 |
| WO | 2018210923 A1 | 11/2018 |
| WO | 2019137870 A1 | 7/2019 |
| WO | 2019206437 A1 | 10/2019 |
| WO | 2019206440 A1 | 10/2019 |
| WO | 2019206487 A1 | 10/2019 |
| WO | 2019206490 A1 | 10/2019 |
| WO | 2020193406 A1 | 10/2020 |

OTHER PUBLICATIONS

"Roboter im Kleinteilelager—Autostore mit 14000 Behältern für die Produktionsversorgung realisiert", F+H Fordern Und Heben, vol. 67, No. 3, Mar. 1, 2017 pp. 40-41, XP001598069, with a machine English translation.

Office Action issued on Jul. 26, 2024, by the Canadian Patent Office in corresponding Canadian Patent Application No. 3,168,846. (6 pages).

Office Action issued on Dec. 10, 2024 by the Korean Patent Office in corresponding Korean Application No. 10-2022-7029298 (8 pages) corresponding to Applicant's U.S. Appl. No. 17/759,331.

Office Action issued on Apr. 2, 2024 by the European Patent Office in corresponding European 21700976.0 (8 pages) corresponding to Applicant's U.S. Appl. No. 17/759,331.

Office Action (Examination Report No. 1) issued on Aug. 14, 2023, by the Australian Patent Office in corresponding Australian Patent Application No. 2021210161. (4 pages).

Office Action issued on Aug. 22, 2023, by the Chinese Patent Office in corresponding Chinese Patent Application No. 202180019732.3, and an English Translation of the Office Action. (27 pages).

Office Action (Examination Report No. 2) issued on May 4, 2024, by the Australian Patent Office in corresponding Australian Patent Application No. 2021210161. (4 pages).

First Office Action issued on Oct. 31, 2023, by the Japanese Patent Office in corresponding Japanese Patent Application No. 2022-544766, and an English Translation of the Office Action. (12 pages).

GB Combined Search and Examination Report under Section 17, issued in corresponding Application No. GB2100864.4 dated Jul. 7, 2021.

GB Examination Report under Section 18(3) issued in corresponding Patent Application No. GB2100864.4 dated Aug. 10, 2022.

GB Search Report under Section 17 issued in corresponding Patent Application No. GB2017257.3 dated Apr. 23, 2021.

International Search Report (PCT/ISA/210) and Written Opinion (PCT/ISA/237) mailed on May 10, 2021, by the European Patent Office as the International Searching Authority for International Application No. PCT/EP2021/051469.

\* cited by examiner

STABILITY OF A LOAD HANDLING DEVICE IN A STORAGE SYSTEM

TECHNICAL FIELD

The present invention relates to the field of load handling devices for handling storage containers or bins in a storage system comprising a grid framework structure storing stacked containers, more specifically to the stability of the load handling device on the grid framework structure.

BACKGROUND

An order fulfilment or warehouse facility typically includes a receiving operation for receiving shipments of stock from various vendors and storing the received stock in inventory. The order fulfilment or warehouse facility typically comprises a storage system or an automated storage system comprising a three-dimensional storage grid structure, within which storage containers/bins are stacked on top of each other, are well known. PCT Publication No. WO2015/185628A (Ocado) describes a known storage and fulfilment system in which stacks of bins or containers are arranged within a grid framework structure. The bins or containers are accessed by load handling devices operative on tracks located on the top of the grid framework structure. A storage system (1) of this type is illustrated schematically in FIGS. 1 to 3 of the accompanying drawings.

As shown in FIGS. 1 and 2, stackable containers, known as bins 10, are stacked on top of one another to form stacks 12. The stacks 12 are arranged in a grid framework structure 14 in a ware-housing or manufacturing environment. The grid framework is made up of a plurality of storage columns or grid columns. Each grid in the grid framework structure has at least one grid column for storage of a stack of containers. FIG. 1 is a schematic perspective view of the grid framework structure 14.

The grid framework structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the grid framework structure 14, so that the grid framework structure 14 guards against horizontal movement of the stacks 12 of bins 10, and guides vertical movement of the bins 10.

The top level of the grid framework structure 14 includes rails 22 arranged in a grid pattern comprising a plurality of grid cells 17 to define a grid structure 15 across the top of the stacks 12. FIG. 2 is a top-down view of a single grid cell 17 of the grid structure showing a stack 12 of bins 10 arranged within the framework structure 14. Each bin 10 typically holds a plurality of product items (not shown), and the product items within a bin 10 may be identical, or may be of different product types depending on the application.

Referring additionally to FIG. 3, the rails 22 support a plurality of load handling devices 30. A first set 22a of parallel rails 22 guide movement of the robotic load handling devices 30 in a first direction (for example, an X-direction) across the top of the grid framework structure 14, and a second set 22b of parallel rails 22, arranged perpendicular to the first set 22a, guide movement of the load handling devices 30 in a second direction (for example, a Y-direction), perpendicular to the first direction. In this way, the rails 22 allow movement of the robotic load handling devices 30 laterally in two dimensions in the horizontal X-Y plane, so that a load handling device 30 can be moved into position above any of the stacks 12.

A known load handling device 30 shown in FIG. 4 comprises a vehicle 32 is described in PCT Patent Publication No. WO2015/019055 (Ocado), hereby incorporated by reference, where each load handling device 30 only covers one grid space of the grid framework structure 14. Here, the load handling device 30 comprises a wheel assembly comprising a first set of wheels 34 consisting a pair of wheels on the front of the vehicle 32 and a pair of wheels 34 on the back of the vehicle 32 for engaging with the first set of rails or tracks to guide movement of the device in a first direction and a second set of wheels 36 consisting of a pair of wheels 36 on each side of the vehicle 32 for engaging with the second set of rails or tracks to guide movement of the device in a second direction.

The load handling device as shown in FIGS. 5(a and b) is equipped with a lifting device or crane device to lift a storage container from above. The lifting device comprise a set of lifting tethers 38 extending in a vertical direction and connected at the four corners of a lifting frame 39, otherwise known as a grabber device (one tether near each of the four corners of the grabber device) for releasable connection to a storage container 10. The grabber device 39 is configured to releasably grip the top of a storage container 10 to lift it from a stack of containers in a storage system of the type shown in FIGS. 1 and 2.

Although not shown in FIGS. 1-3, the load handling device 30 is powered during operation by an on-board rechargeable battery. Examples of rechargeable batteries are Lithium-Ion battery, Nickel-Cadmium battery, Nickel-Metal Hydride battery, Lithium-Ion Polymer battery, Thin Film battery and Smart battery Carbon Foam-based Lead Acid battery. The battery is recharged while the load handling device 30 is operative on the grid framework structure by a charge station. The charge station is typically an L shaped structure that is fixed proximate to the grid framework structure and extends over a nominal grid cell at an edge of the grid structure. The charge station comprises a charge head comprising charge contacts which are fixed in position relative to the charge station. The charge head is mounted to one arm of the L shaped structure such that the charge head is suspended over at least two grid spaces of the grid framework. A load handling device may be charged by being instructed to move to a grid cell above which the charge head is located. As the load handling device moves into the grid cell, a contact is made between a charge contact pad on a top surface of the load handling device, and the charge contacts of the charge head. A charge is imparted to the load handling device from the charge contacts through the charge contact pad situated on the top surface of the load handling device.

As the items stored in the containers can include various food and grocery commodities of a perishable nature that is required to be stored at strict storage temperatures, the load handling device is operable on the grid framework structure in harsh temperature conditions. The different storage temperatures include ambient control temperature, chilled temperature and frozen temperature. Frozen temperature covers a range between substantially −25° C. to substantially 0° C., more preferably between substantially −21° C. to substantially −18° C.; the chilled temperature covers a range between substantially 0° C. to substantially 4° C., preferably between substantially 0° C. to substantially 5° C. and the ambient controlled temperature coves a range between substantially 4° C. to substantially 21° C., preferably substantially 18° C. As a result, charging of the battery may occur at the various temperature conditions depending on whether the charger is located in the ambient, chilled or frozen zones of the fulfilment center.

During charging of a battery, a portion of the electric current from the charge station is converted into thermal energy. The thermal energy must be dissipated outside of the battery or the heat will build up, raising the temperature of the battery. With the charging station delivering a charge in excess of 150 amps at 48 volts, control over the temperature of the battery is paramount to prevent thermal runaway of the battery. When the amount of heat dissipated is large, the temperature of the battery will exceed a normal temperature range, resulting in the performance of the battery being degraded and the cycling service life of the battery ultimately being shortened. For example, one of the most common type of batteries used to deliver power to drive the wheels and the lifting drive mechanism in the load handling device is a lithium ion battery. Such batteries have the ability to create their own internal supply of oxygen when overheated. More specifically, oxygen is liberated from the anode at elevated temperatures which are largely composed of a cobalt or nickel-cobalt oxide. Since both oxygen and fuel are internally available to the cells, a fire can start within one or more of the battery cells. Unless the fire is extinguished, it will continue until all of the flammable materials in the battery have been exhausted.

One of the contributing factors for batteries to heat up while being charged is its internal resistance. A higher internal resistance of the battery causes the battery to heat up when charging and the heat can cause damage leading to safety issues. A low internal resistance allows a battery to deliver high current on demand whereas a high internal resistance causes current to be restricted and the voltage across the load to drop. The internal resistance of the battery is very much dependent on the temperature and increases as the ambient temperature decreases. This is because cold temperature cause the electrochemical reactions that take place within the battery to slow down and therefore, cause a reduction in the mobility of ions in the electrolyte. As the load handling device can be operable in the chilled or frozen zones of a fulfilment center, heating of the batteries during charging of the battery but also during discharge is becoming an increasing problem when operational on the grid structure causing shortening the effective cycling service life of the battery. Various attempts have been made in the art to mitigate this heating of the battery which can lead to thermal runaway. Thermal runaway refers to a situation where the internal temperature of the battery increases to high temperatures, e.g. 200° C. or more, for some reasons such as an internal short circuit or overcharge to promote chemical reaction in the battery and to accelerate the temperature rise of the inside of the battery cell.

One of the solutions suggested in the art is to re-position the one or more batteries in the body of the load handling device so as to effectively dissipate heat to the surroundings, particularly during charging. WO 2019/206440 (Autostore Technology AS) teaches a container handling vehicle for picking up storage containers from a three-dimensional grid of an underlying storage system, comprising a first set of wheels arranged at opposite portions of a vehicle body, for moving the vehicle along a first direction (X) on a rail system in the grid; a second set of wheels arranged at opposite portions of the vehicle body, for moving the vehicle along a second direction (Y) on the rail system in the grid, the second direction (Y) being perpendicular to the first direction (X). The vehicle body comprises walls on all sides and forms a quadrilateral footprint, a first section and a second section arranged side-by-side such that a center point of the first section is arranged off center relative a center point of the footprint formed by the vehicle body, and wherein a size ratio of a footprint of the first section relative a footprint of the second section is at least 2:1, and wherein the first section is configured to accommodate a storage container, and the second section comprises at least a first battery. The second section is more open to allow necessary cooling of the batteries and the motors. However, arranging the first and second section side-by-side whereby the first section is equal to the size of a single grid cell has meant that the second section extends beyond the footprint of the first section. Since the footprint of the first section occupies a single grid cell, the total footprint of the vehicle extends beyond a single grid cell.

During operation on the grid structure, the load handling device can travel as fast 4 m/s and accelerate 2 m/s$^2$ on the grid structure. Thus, as well heating of the batteries during charging and heavy loads during discharge, the positioning of the batteries in the body of the load handling device has an influence on the stability of the load handling device on the grid structure. Weighing as much as 30 kg, the position of the battery has an influence on the center of gravity (CoG) of the load handling device. A high CoG lowers the stability of the load handling device on the grid structure. WO 2019/206440 (Autostore Technology AS) has mitigated this problem by increasing the footprint of the load handling device to extend over a single grid cell of the grid structure by mounting the battery externally or to the side of the container receiving space of the body of the load handling device. The increased footprint of the load handling device offers improved stability of the load handling device and the positioning of the battery allows heat to be dissipated from the battery.

A load handling device is thus sought that does not suffer from the above problems whilst still having a footprint that occupies a single grid cell.

This application claims priority from UK Patent Application Nos. GB2001012.0 filed 24th January 2020, GB2003101.9 filed 4th March 2020, and GB2017257.3 filed 30th October 2020, the content of these applications hereby being incorporated by reference.

SUMMARY OF THE INVENTION

The present applicant has mitigated the above by providing a load handling device or a robotic load handling device for lifting and moving one or more containers stacked in a storage system comprising a grid framework structure supporting a plurality of tracks arranged in a grid pattern to define a grid structure above the one or more stacks of containers, the grid structure comprising a plurality of grid cells and each of the one or more stacks of containers being located within a footprint of only a single grid cell, the load handling device or robotic load handling device comprising:
  A) a driving mechanism operatively arranged for moving the load handling device on the grid structure,
  B) a vehicle body having a footprint that, in use, occupies substantially only a single grid cell in the storage system, said vehicle body housing:
    i) a rechargeable power source for powering the driving mechanism;
    ii) a first space and a second space, the first space being configured for accommodating a container and the rechargeable power source is housed in the second space;

iii) a lifting device or mechanism comprising a lifting drive assembly and a grabber device configured, in use, to releasably grip a container and lift the container from the stack into the first space, wherein the rechargeable power source is arranged above the first space such that the center of mass of the load handling device is in the second space.

The load handling device comprises a wheel assembly comprising a first set of wheels consisting of a pair of wheels on the front of the vehicle body and a pair of wheels on the back of the vehicle body for engaging with the first set of rails or tracks to guide movement of the device in a first direction, and a second set of wheels consisting of a pair of wheels on each side of the vehicle body for engaging with the second set of rails or tracks to guide movement of the load handling device in a second direction. Where the footprint defined by the body of the load handling device occupies a space within a single grid cell, the present applicant has realised that having the rechargeable power source above the container receiving space such that the center of gravity (CoG) or center of mass (COM) of the load handling device in the space occupied by the rechargeable power source, the stability of the load handling device is surprisingly improved on the grid structure. For the purpose of the present the phrase "a footprint that occupies a single grid cell" is construed to mean that the footprint of the load handling device does not extend into an adjacent grid cell in the sense that wheels of the load handling device rest on the tracks around the periphery of the single grid cell 10 (see FIG. 2) such that the grabber device of the load handling device is able to descend into the single grid cell and retrieve a container stored in a grid column. To achieve a single grid cell load handling device, the container is stored in the container receiving space within the vehicle body of the load handling device. This is clearly demonstrated in FIG. 5. The terms "center of gravity" and "center of mass" are used interchangeably in the description. Where the load handling device is influenced by a gravitational field, the center of mass is equivalent to the center of gravity of the load handling device. Thus, the location of the center of mass and center of gravity are equivalent. The lower the center of gravity of the load handling device, the more stable is the load handling device. As the weight of the rechargeable power source represents a significant portion of the total weight of the load handling device, the position of the rechargeable power source in the vehicle body influences the location of the center of gravity of the load handling device. Preferably, the rechargeable power source is located directly above the first space, i.e. the second space is directly above the first space.

Preferably, the center of mass of the load handling device is off center from the center point of the load handling device by −10 mm to −13 mm in the X direction, 440 mm to 490 mm range in the Y direction, 4.5 mm to 6 mm range in the Z direction. The X-direction, Y-direction and Z-direction represent the Cartesian coordinates (in three dimensional planes) when the load handling device is in an upright position. The center of mass is defined with reference to its displacement from the center of the body of the load handling device in the X, Y and Z direction—the center of the body of the load handling device being the origin, 0, 0, 0. For the purpose of the present invention, the Y direction extends in a vertical direction along a vertical axis. The X and Z direction lie in a horizontal plane. Thus, the greater the Y coordinates, the higher the center of mass and the more unstable is the load handling device on the grid structure.

The location of the rechargeable power source in the vehicle body is such that the center of mass remains in the second space when the load handling device is carrying a payload, i.e. when there is a container in the first space of the vehicle body. Preferably, the first space accommodates a container such that the center of mass of the load handling device is displaced off center from the center point of the load handling device by −12 mm to 13 mm in the X direction, 470 mm to 475 mm in the Y direction, 5.00 mm to 5.6 mm in the Z direction. Preferably, the container comprises a payload having a weight of approximately 35 kg such that the center of mass of the load handling device is displaced off center from the center point of the load handling device by −10 mm to 11 mm in the X direction, 440 mm to 450 mm in the Y direction, 4.5 mm to 5.0 mm in the Z direction. Preferably, the rechargeable power source displaces the center of gravity of the load handling device by 40 mm to 45 mm in the X direction, 50 mm to 60 mm in the Y direction and 5 mm to 7 mm in the Z direction.

To locate the CoM within the second space such that the CoM remains in the second space, preferably the rechargeable power source is mounted substantially centrally between a pair of opposing sidewalls of the vehicle body. Preferably, the lifting device comprises a first pair spools separately carrying a first pair of lifting tethers and a second pair of spools separately carrying a second pair of lifting tethers, the first and second spools being driven by the lift drive assembly to raise or lower the grabber device relative to the vehicle body, and wherein the first pair of spools is spaced apart from the second pair of spools so as to define the second space such that the rechargeable power source is partially located between the first pair of spools and the second pair of spools. For example, the rechargeable power source is located between one of the wheels of the first and second pair of spools.

Preferably, the rechargeable power source and the lifting drive assembly are mounted in the same horizontal plane. Optionally, the rechargeable power source and the lifting drive assembly are mounted on a tray. By mounting the rechargeable power source and the lifting drive assembly on a tray in the same horizontal plane, the weight of the rechargeable power source balances the weight of the lifting drive assembly in the vehicle body. The lifting drive assembly comprises a motor for driving the first and second pair of spools to raise and lower the grabber device. The lifting drive assembly further comprises one or more lifting tethers wound on the first and second pair of spools and are attached to the grabber device. The balancing between the weight of the rechargeable power source and the weight of the lifting drive assembly help to maintain the stability of the load handling device on the grid structure, i.e. the motor of the lifting drive assembly counterbalances the weight of the rechargeable power source.

Preferably, the second space is accessible from an exterior side of the vehicle body such that the rechargeable power source is removable from an exterior side wall of the vehicle body. Preferably, the rechargeable power source is removable from the vehicle body by pulling from a first face of the rechargeable power source. Optionally, the rechargeable power source is set back on the tray such that the rechargeable power source can be easily accessible from the side the vehicle body. Preferably, the lifting drive assembly is mounted adjacent a second face of the rechargeable power source, the second face being opposite the first face. To assist with the removal of the rechargeable power source, preferably the rechargeable power source is mounted on rails such that the rechargeable power source can easily be slid out from the side of the vehicle body.

Preferably, the vehicle body comprises walls on all sides and forms a quadrilateral footprint that, in use, substantially occupies only a single grid cell in the storage system. Thus, exchange of the rechargeable power source involves removing one of the side walls or panels of the vehicle body to expose the first face of the rechargeable power source whereby pulling from the first face removes the rechargeable power source from the vehicle body.

Preferably, the drive assembly comprises a wheel assembly comprising a first set of wheels for moving the load handling device in a first direction and a second set of wheels for moving the load handling device in a second direction. Preferably, the vehicle body comprises a chassis having an upper portion and a lower portion, the rechargeable power source is mounted in the upper portion and the wheel assembly is mounted in the lower portion, and wherein a greater proportion of the mass of the chassis is in the lower portion. By varying the mass or weight of the chassis vertically, a greater proportion of the mass of the chassis can be concentrated in the lower portion, i.e. the mass of the lower portion of the chassis is greater than the upper portion of the chassis. By concentrating the weight of the chassis in the lower portion of the chassis, the stability of the load handling device having a footprint that occupies a single grid cell is improved. Optionally, the wheel assembly is mounted on a chassis and wherein the mass of the chassis is greater than the mass of the battery. The weight of the chassis helps to counteract the weight of the rechargeable power source above the first space. Preferably, the vehicle body comprises side panels mounted to the chassis. Optionally, the wheel assembly is mounted on a chassis and wherein the mass of the chassis is greater than the mass of the battery. Optionally, the chassis comprises wheel mounting plates, the wheel assembly is mounted to the wheel mounting plates and the wheel mounting plates having a weight greater than the weight of the battery. Preferably, the wheel mounting plates comprises a first pair of opposing plates and a second pair of opposing plate such that the first set of wheels are mounted to the first pair of opposing plates and the second set of wheels are mounted to the second set of opposing plates.

Preferably, the rechargeable power source comprises a plurality of rechargeable power cells electrically connected together and housed in a casing to define a cassette or casing. Encapsulating the rechargeable power source in a cassette provides a standardised enclosure to occupy the second space of the vehicle body. The interior cavity of the cassette being flexible to occupy different types and/or shapes of rechargeable power sources. Preferably, the rechargeable power cells comprises battery cells.

The present invention provides an automated storage system comprising:
 a first set of tracks and a second set of tracks running transversely to the first set of tracks in a substantially horizontal plane to form a grid pattern comprising a plurality of grid spaces or grid cells;
 a plurality of stack of containers located beneath the first set of parallel pathways and second set of parallel pathways, wherein each of the stack of containers occupies a single grid space or grid cell,
 a robotic load handling device as claimed in the present invention arranged to traverse along the first set and the second set of tracks over the plurality of grid spaces or grid cells such that when positioned above a stack of containers occupying a grid space or grid cell, the lifting device is configured to lift at least one container from said stack of containers.

The term load handling device and robotic load handling device are used interchangeably in the description to represent the same feature.

DESCRIPTION OF THE DRAWINGS

Further features and aspects of the present invention will be apparent from the following detailed description of an illustrative embodiment made with reference to the drawings, in which.

DETAILED DESCRIPTION

Figure 6:
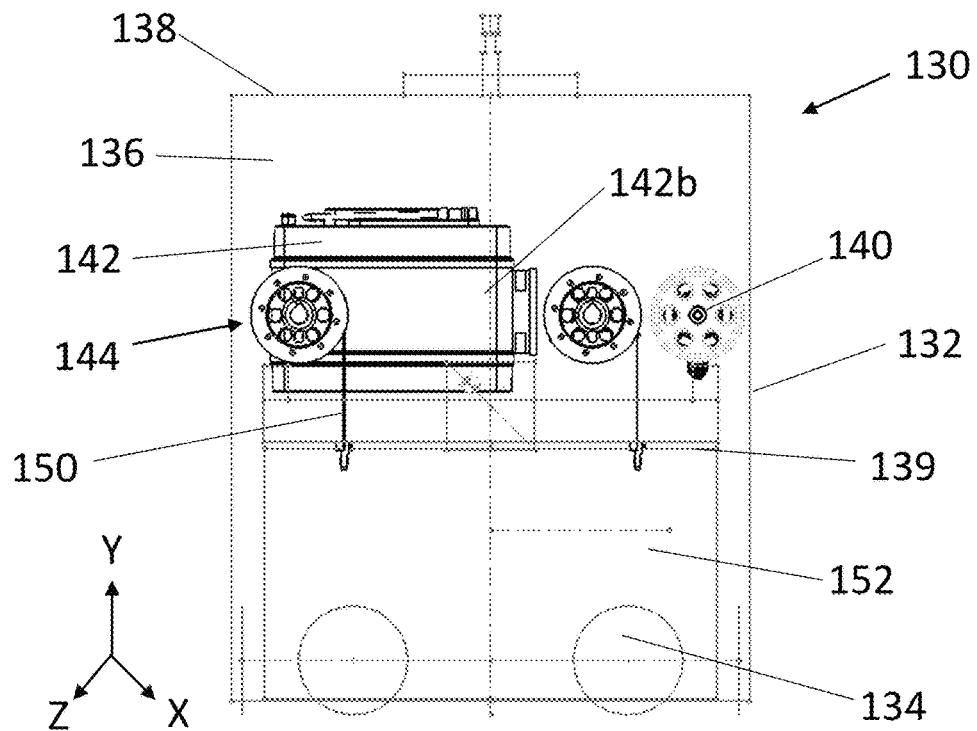
FIG. 6 is a perspective view of a load handling device according to an embodiment of the present invention showing the battery receiving space.
Figure 7:
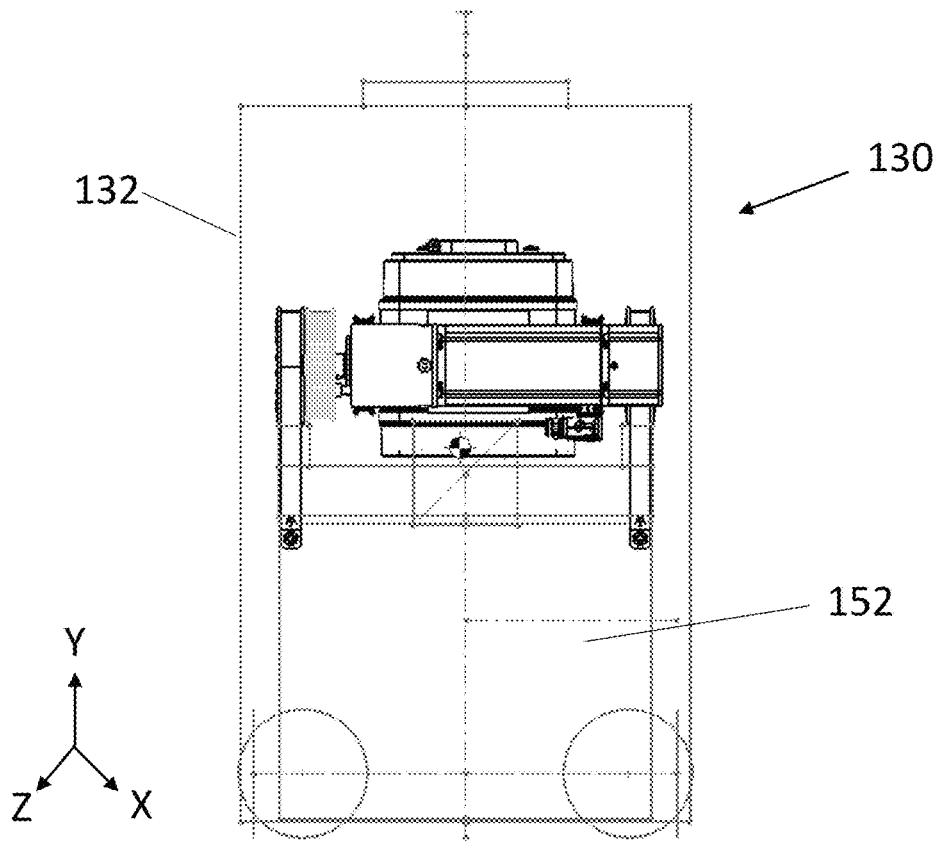
FIG. 7 is a perspective side view of the load handling device according to the embodiment of the present invention.

FIG. 6 shows a perspective side view of a load handling device 130 and FIG. 7 shows a rear view of the load handling device 130 according to an embodiment of the present invention. For the purpose of explanation of the present invention, the bulk of the auxiliary components of the load handling device such as the electronic auxiliary components, and the drive assembly for moving the load handling device on the tracks are absent so as to make it clear of the position of the battery in the body of the load handling device. The load handling device 130 shown in FIG. 6 and FIG. 7 comprises a vehicle body 132 mounted on a wheel assembly 134 comprising a first set of wheels for guiding the load handling device in a first direction on the tracks and a second set of wheels for guiding the load handling device in a second direction on the tracks. The vehicle body 132 comprises side panels 136 and a top panel 138. In the particular embodiment of the present invention, the vehicle body 132 defines a footprint that occupies a single grid cell or is within a single grid cell of the grid structure.

As discussed in the introductory part of the patent, the first set of wheels comprises first pair of wheels at the front of the vehicle body and a pair of wheels at the back of the vehicle body 132. The first set of wheels are arranged for engaging with a first set of tracks or rails. The second set of wheels comprises a pair of wheels on each side of the vehicle body for engaging with a second set of tracks. The first and second set of wheels are configured to selectively disengage with the first and second set of tracks by moving vertically, thereby allowing the load handling device 130 to move in a desired direction on the grid structure, i.e. X-Y direction on the grid structure.

Figure 1:
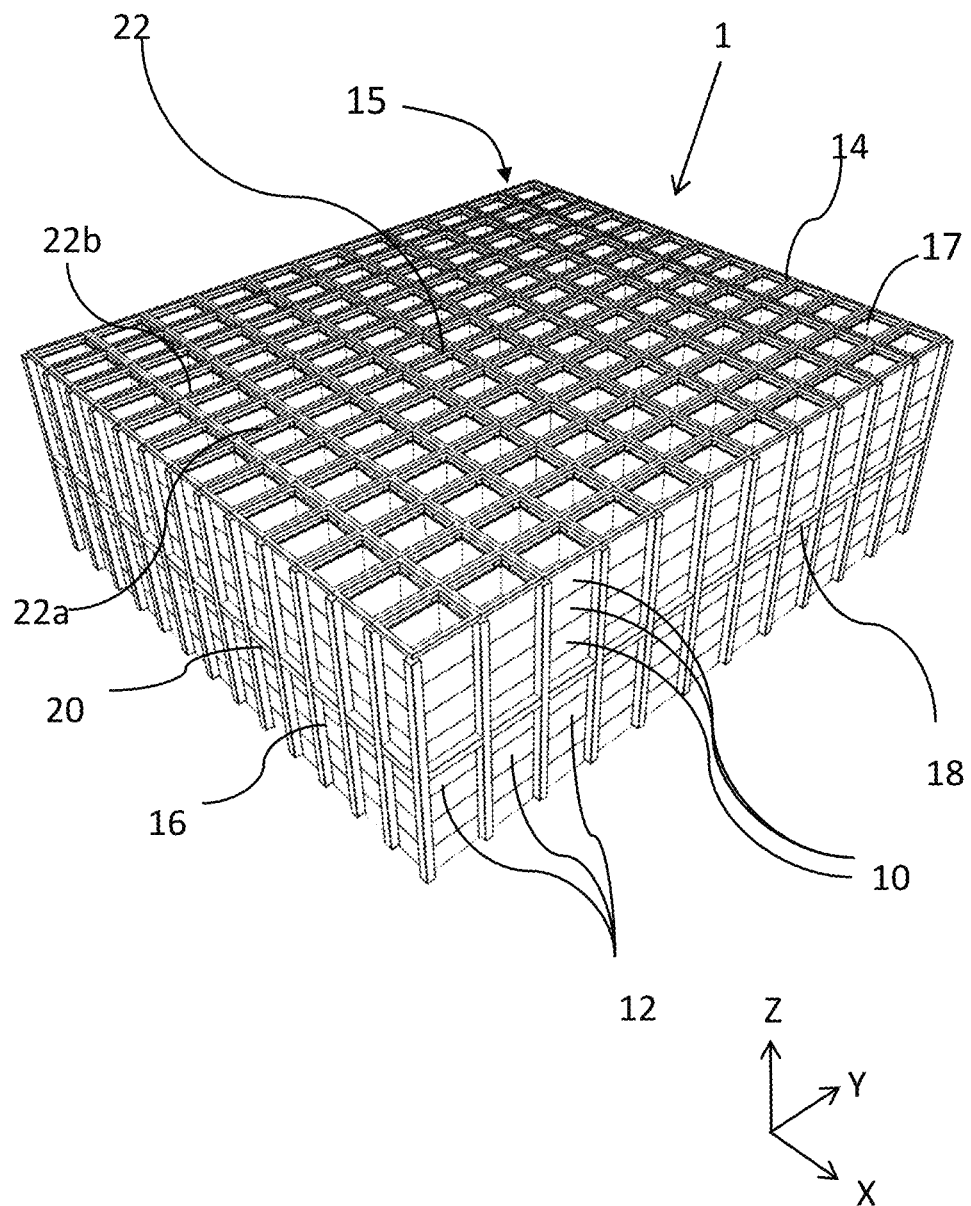
FIG. 1 is a schematic diagram of a grid framework structure according to a known system.
Figure 2:
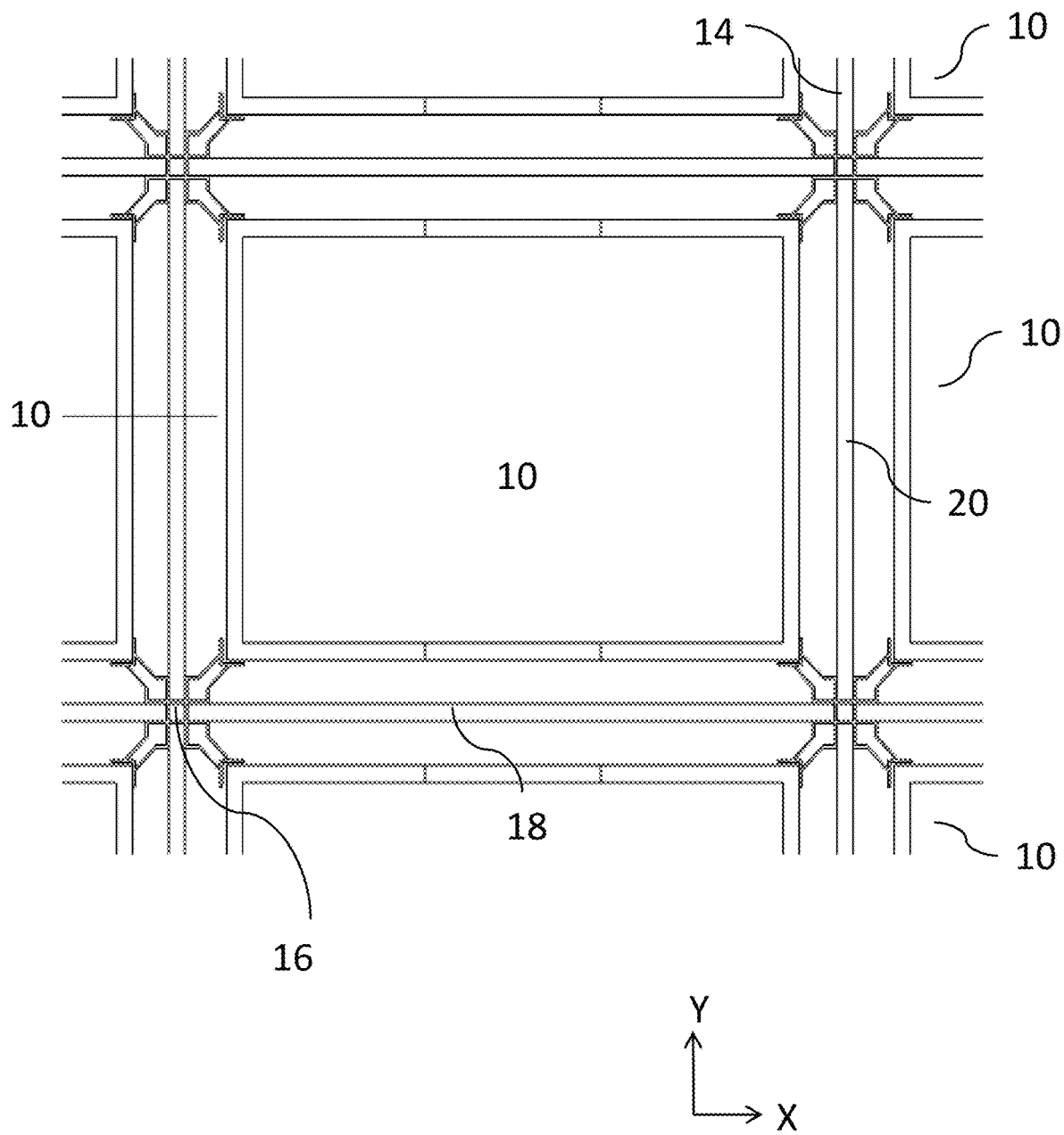
FIG. 2 is a schematic diagram of a top down view showing a stack of bins arranged within the framework structure of FIG. 1.
Figure 3:
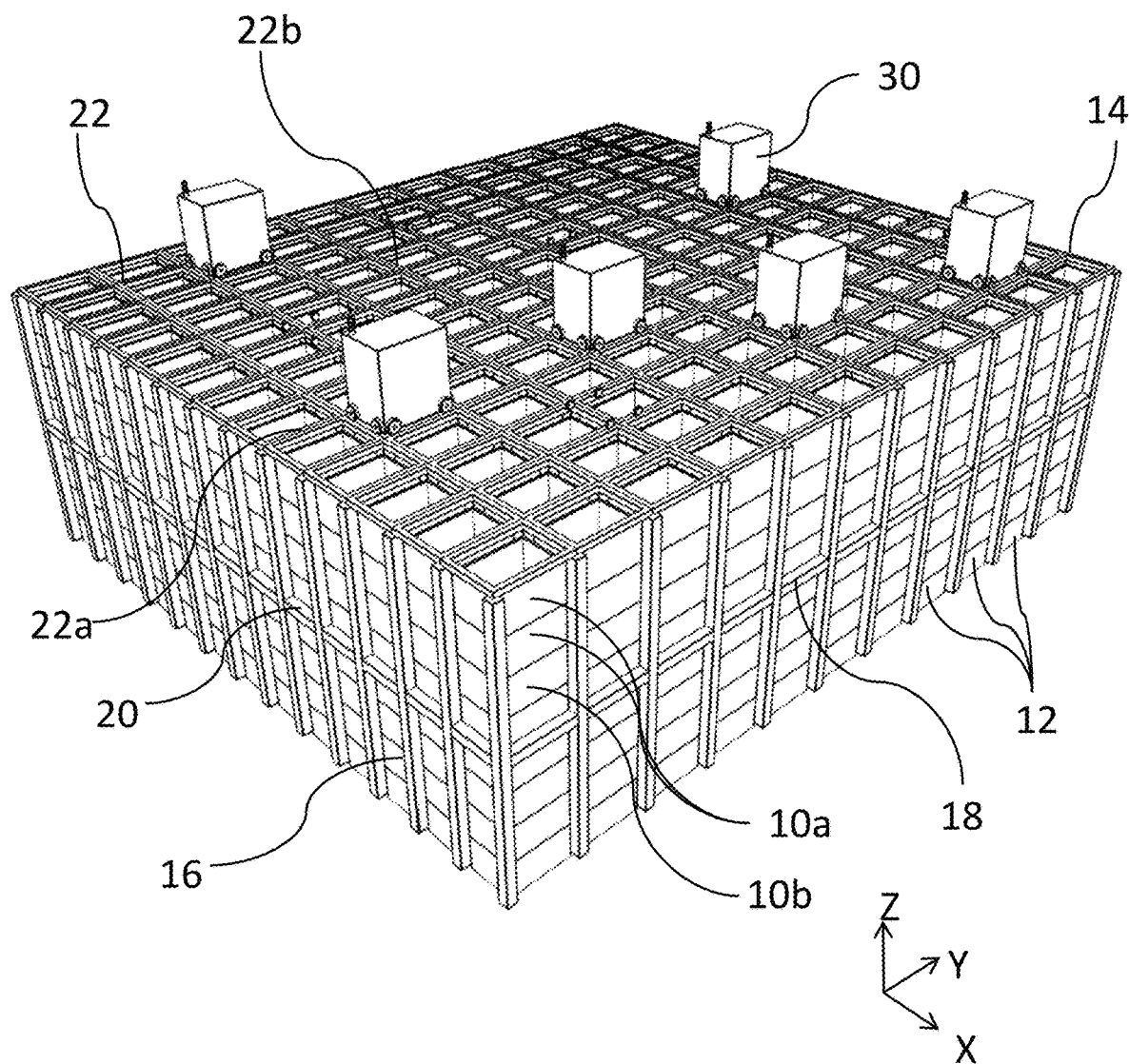
FIG. 3 is a schematic diagram of a known storage system of a load handling device operating on the grid framework structure.
Figure 4:
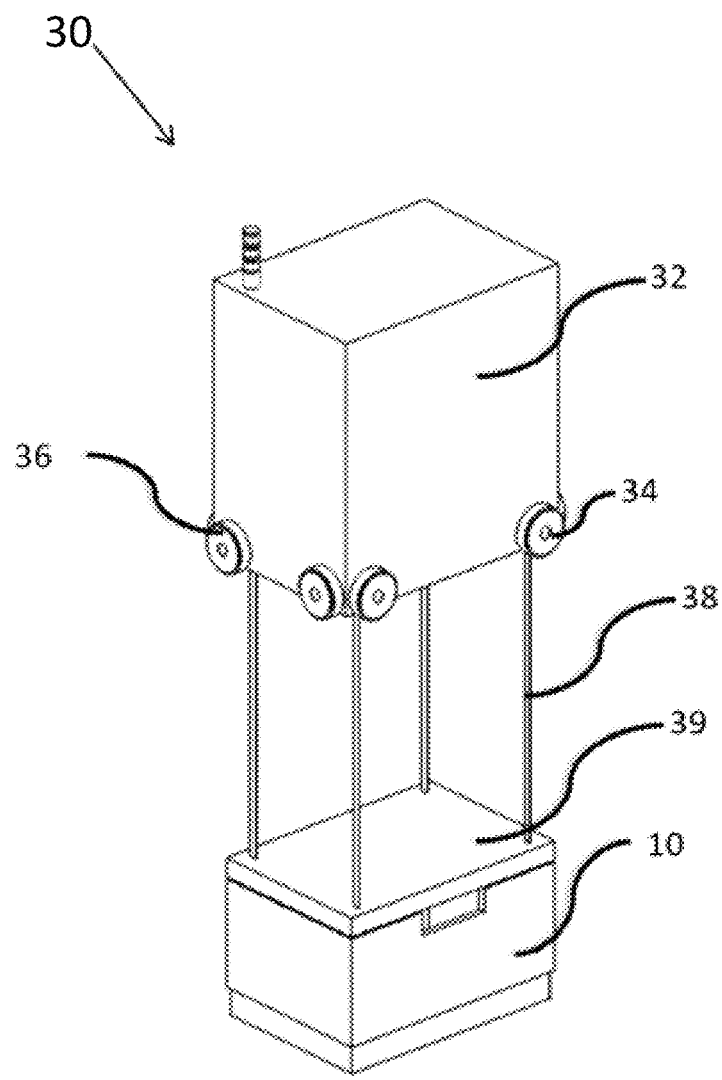
FIG. 4 is a schematic perspective view of the load handling device showing the lifting device gripping a container from above.
Figure 5:
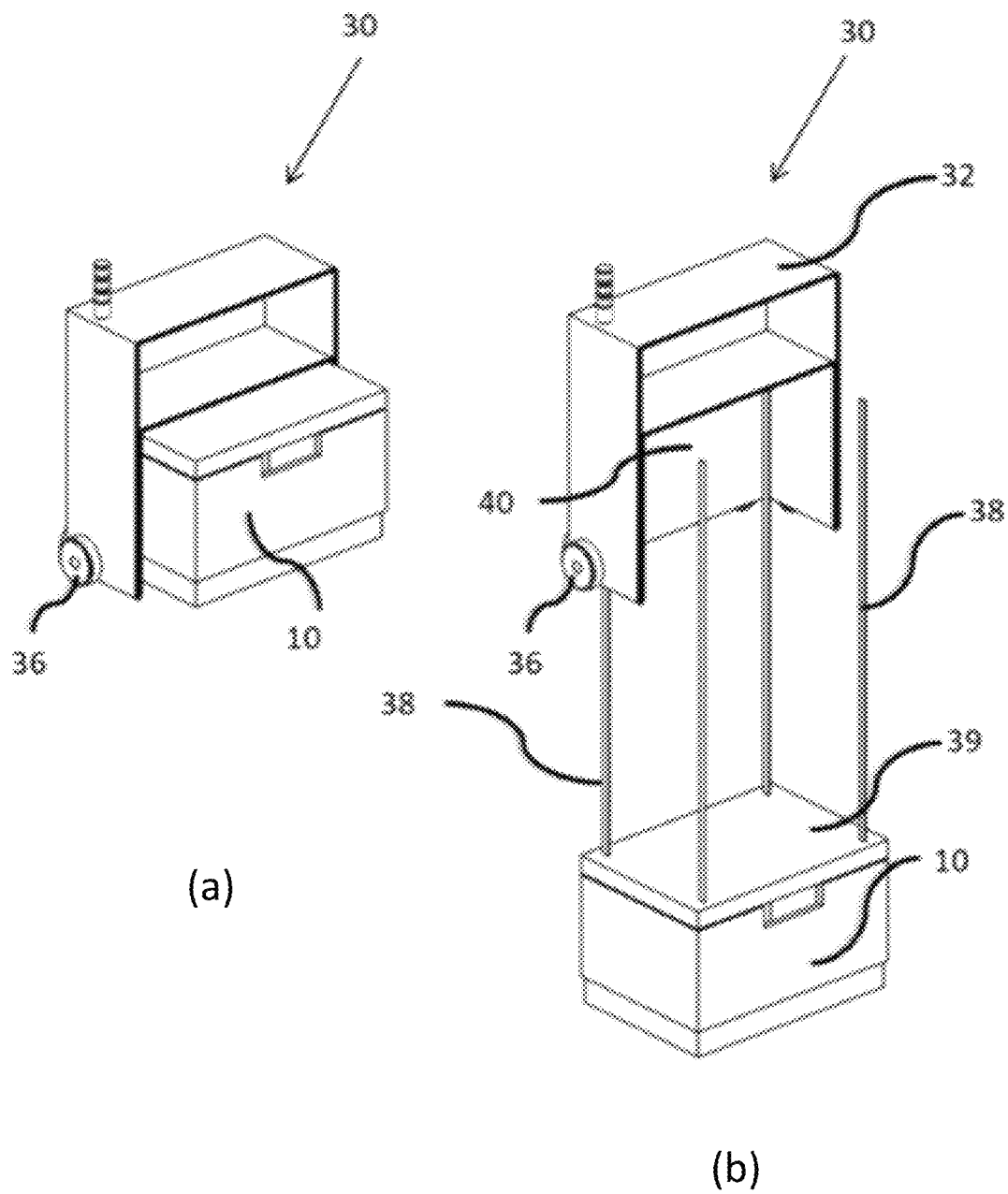
FIGS. 5(a) and 5(b) are schematic perspective cut away views of the load handling device of FIG. 4 showing (a) the container receiving space of the load handling device and (b) a container accommodating the container receiving space of the load handling device.
Figure 8:
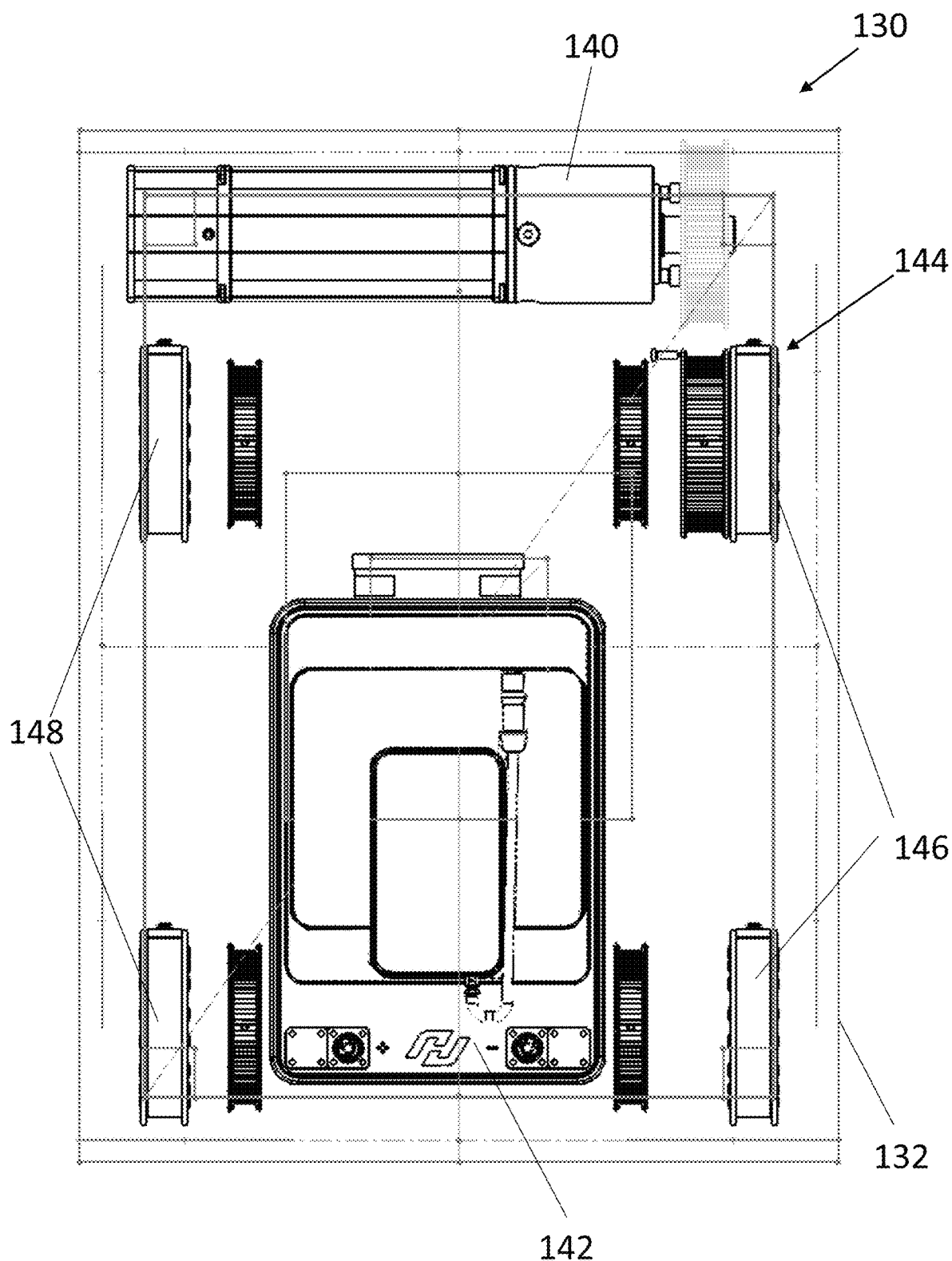
FIG. 8 is a perspective top view of the load handling device showing the arrangement of the battery and the lifting drive assembly according to the embodiment of the present invention.

Also present in the schematic drawing in FIGS. 6 to 8 is a lifting drive assembly 140 for winching a grabber device 139 into the body 132 of the load handling device 130 and a battery 142 for supplying power to the lifting drive assembly 140 as well as the wheel assembly 134. The lifting drive assembly comprises a motor 140 that is configured to raise and lower the grabber device 139. In the particularly embodiment of the present invention, the motor 140 of the lifting drive assembly is a single motor but is not limited to being a single motor. The lifting device or mechanism further comprises a winch assembly 144 comprising a first 146 and second 148 pair of winches or spools. The first and second pair of winches or spools 146, 148 separately carry lifting tethers 150 that are attached to the grabber device 139. As is apparent in FIG. 8, the first and second pair of winches 146, 148 are mounted spaced apart in the vehicle body 132 to define a battery receiving space for accommodating the battery 142 of the present invention. For the purpose of explanation of the present invention, the container receiving space 152 for accommodating a container below the battery 142 is termed a first space and the space for accommodating the battery of the present invention is termed a second space 142b. The grabber device 139 is configured to grip the top of the container and lift it from a stack of containers in a storage system of the type shown in FIGS. 1 and 2. Typically, the grabber device 139 is configured as a frame and four lifting tethers are fixed to each corner of the grabber device as shown in FIG. 5. A first pair of lifting tethers are attached to one side of the grabber device 139 and wound on the first pair of winches 146 and a second pair of lifting tethers are attached to other side of the grabber device 139 and wound on the second pair of winches 148.

The battery 142 shown in FIG. 8 is positioned in the second space defined by the first 146 and second 148 pair of winches. The battery 142 is set back towards one of the side walls 136 of the vehicle body 132 such that the battery 142 is positioned partially between the first and second pair of winches 146, 148, more specifically, between a single winch or spool of the first pair of winches 146 and a single winch of the second pair of winches 148. This allows the battery to be easily exchangeable through one of the side walls of the vehicle body 132. In the particular embodiment shown in FIG. 8, the battery 142 is set back towards either the front or back wall of the vehicle body 132. In addition, the position of the battery 142 above the first space 152 and partially between first and second pair of winches 146, 148 in the vehicle body 132 lowers the center of gravity of the load handling device and therefore, improves the stability of the load handling device on the grid structure. This particularly beneficial where the vehicle body of the load handling device defines a footprint that occupies a single grid cell. Further details of the position of the battery in the vehicle body influencing the center of gravity or center of mass of the load handling device is discussed below.

Figure 9:
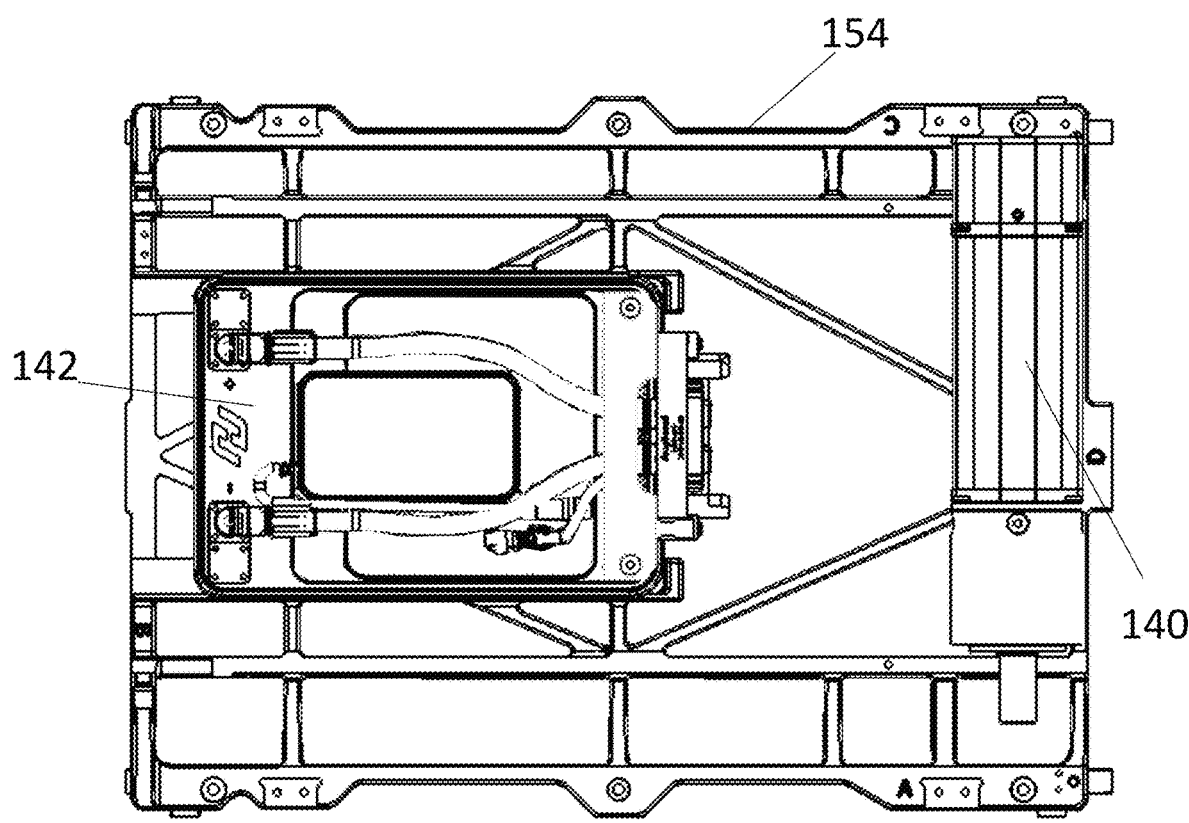
FIG. 9 is a perspective top view of the mounting tray supporting the battery and the lifting drive assembly of the present invention.
Figure 10:
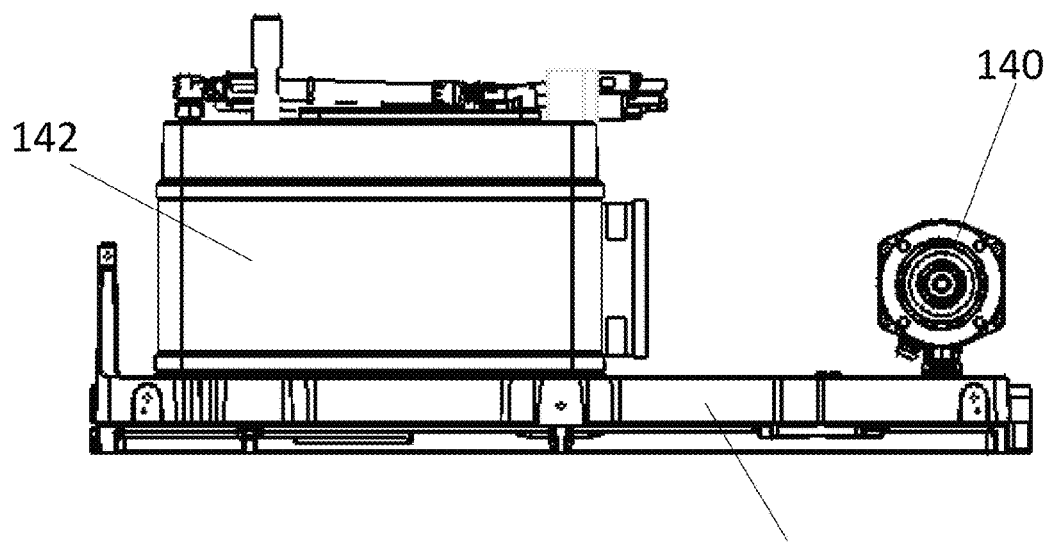
FIG. 10 is a perspective side view of the mounting of the battery and the lifting drive assembly according to the embodiment of the present invention.

The battery 142 of the present invention is secured in the vehicle body 132 by being mounted to a tray or sub-frame 154 as shown in FIGS. 9 and 10. To balance the weight of the battery 142 in the load handling device and thus, improve the stability of the load handling device, the use of a tray 154 to mount the battery 142 allows the weight of other auxiliary or hardware components to counter balance the battery in the load handling device. In the particular embodiment of the present invention, the battery 142 and the lifting drive assembly 140 are mounted adjacent each other and at opposing ends of the tray 154 such that the weight of the battery 142 counteracts (counterbalances) the weight of the lifting drive assembly 140. The lifting drive assembly 140 in the particular embodiment of the present invention comprises a single hoist motor. Balancing the weight of the battery 142 with the weight of the lifting drive assembly 140 in the load handling device 130 help to stabilise the load handling device in an upright position on the tracks.

Figure 11:
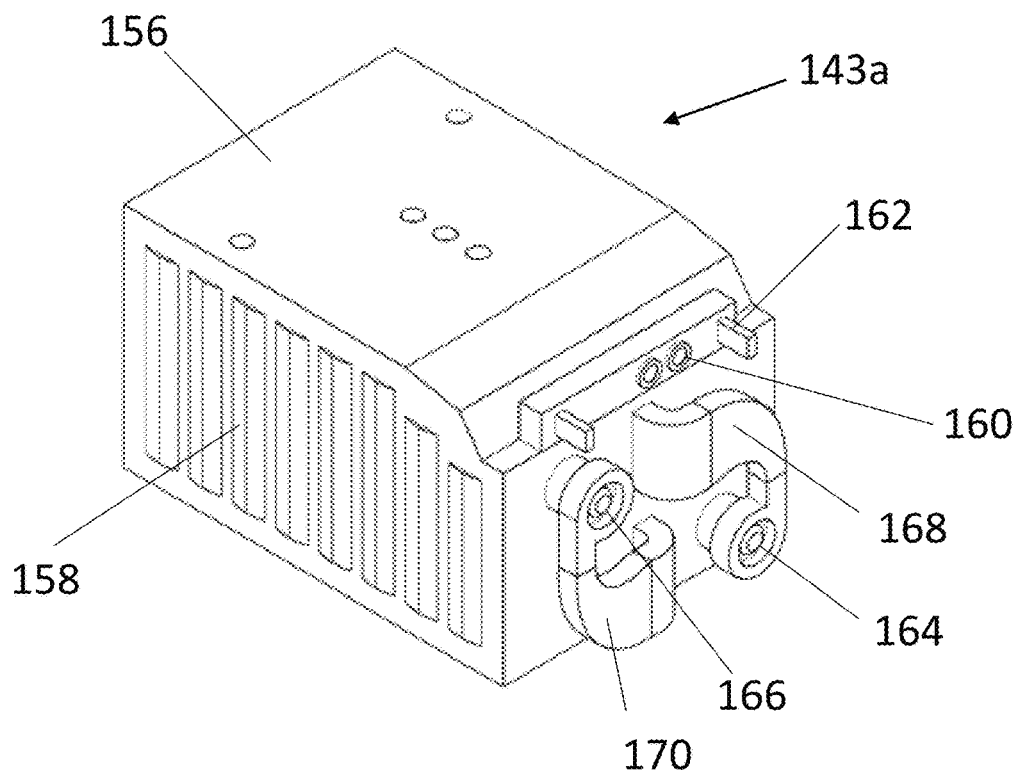
FIG. 11 is a perspective view of a battery cassette according to an embodiment of the present invention.
Figure 12:
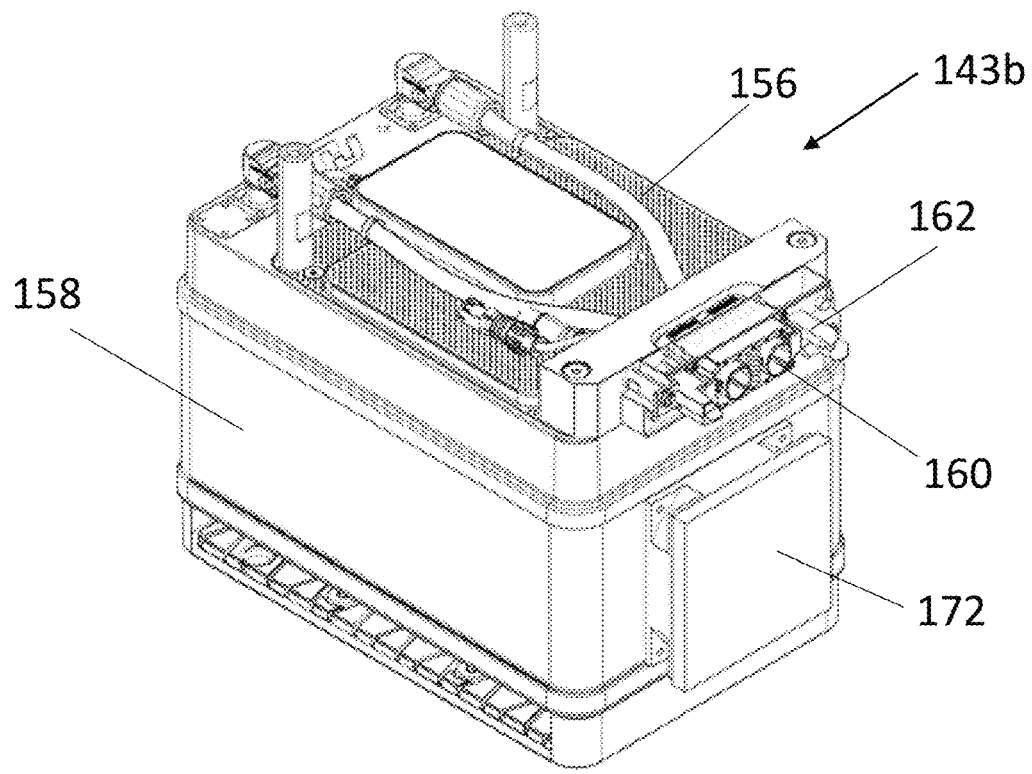
FIG. 12 is a perspective view of a battery cassette according to another embodiment of the present invention.

Also shown in FIGS. 9 and 10 and more particularly in FIGS. 11 and 12, the battery is housed in a casing or cassette 143. The use of a cassette 143 to house the battery provides the flexibility to accommodate different type's battery cells from various manufactures so that the battery is not limited to one specific manufacturer and/or size and/or shape of battery. Whilst the exterior walls of the cassette 143 are sized and shaped to fit into the second space above the container receiving space in the vehicle body, the interior space or cavity of the cassette can be adapted to accommodate different types and/or shapes of batteries or other rechargeable power sources. For example, the exterior shape and/or size can be standardised whereas the interior space or cavity of the cassette 143 can be made flexible.

Moreover, the cassette 143 of the present invention can also accommodate a thermal management system to regulate the temperature of the battery housed within the cassette; details of which will be discussed below. Examples of the cassette 143 of the present invention housing the battery are shown in FIGS. 11 and 12. In either examples, the cassette or casing 143 comprises top and bottom walls 156 and sidewalls 158. The cassette 143 can be fabricated as a single body or separate parts bonded together. Optionally, the cassette 143 is formed from plastic material.

The sidewalls 158 comprises front and rear walls that are arranged to provide a quadrilateral footprint. In the particular embodiment of the present invention shown in FIGS. 11 and 12, the front or rear wall of the cassette comprise at least two terminals 160 corresponding to the positive and negative DC terminals. The at least two terminals 160 are electrically coupled to a stack of battery cells in the cassette and are arranged to electrically couple with complementary shaped electrical connectors in the vehicle body. Positioning the at least two terminals at the front or rear of the cassette allows the cassette to be slid into the vehicle body from one of the sides of the vehicle body 132 rather than being lowered in from the top of the vehicle body. This allows the battery to be easily swapped or exchanged simply by removing one of the side panels of the vehicle body and sliding the cassette 143 into the second space between the winches or spools of the lifting mechanism. The at least two terminals 160 are shown as two male portions that are configured to be received in at least two correspondingly shaped female mating portions in the vehicle body. However, the present invention is not limited to the male mating portions being on the cassette 143 that is arranged to electrically couple with female mating portions on vehicle body as the reverse arrangement is applicable in the present invention where the male mating portions are in the vehicle body that are configured to electrically couple with female mating portions on the front wall of the cassette 143. To help guide the at least two electrical terminals into engagement with the electrical connectors in the vehicle body, one or more guides 162 can be mounted to the front or rear wall of the cassette that are received into correspondingly shaped recesses in the vehicle body. The one or more guides 162 can comprise tapered ends to assist with the proper positioning of the at least two terminals 160 into engagement with the electrical connectors in the vehicle body.

When installing or exchanging the cassette 143 from the load handling device 130, the operator would simply remove one of the side panels of the vehicle body. If there is already a cassette in the body of the load handling device, the operator would remove the existing cassette by pulling from the front or rear face of the cassette depending on whether the electrical connectors are at the front or rear of the cassette so as to cause the cassette 143 to slide out of its seating area in the second space. The front face being the first face of the cassette and the rear face opposite the front face being defined as a second face of the cassette. The cassette is preferably mount on rails or tracks in the vehicle body so as to allow the cassette to be easily slid out. The seating area of the cassette in the vehicle body is more apparent in FIG. 9. A freshly charged battery is installed into the second space by pushing the cassette along the rails so that the electrical terminals at the second face comprising the electrical connectors engages with complementary shaped electrical connectors in the vehicle body. Side loading of the cassette allows the battery to be easily exchanged.

A battery may generate a certain amount of heat no matter whether the battery is in a charging state or in a discharging state. When the heat generated is large, the temperature of the battery will exceed a normal optimal temperature range, resulting in a reduced performance of the battery and ultimately, the cycling service life of the battery is reduced. As the internal resistance ESR (equivalent series resistance) of the battery increases at low temperatures, the problem of heat dissipation during charging of the battery is exacerbated in the chilled and/or frozen zone of the fulfilment center where temperatures can reach at low as minus 18° C. Charging can involve delivering a current through the battery of about 160 amps at 48 volts. Thus, a small increase in the internal resistance of the battery results in a large amount of heat generated. For the purpose of the present invention, the ideal temperature range for optimum performance of the battery is in the region of 20° C. to 40° C. Since, the operational temperature of the battery influences the optimal performance of the battery, heat dissipated from the other auxiliary electrical components in the vehicle body will also influence the operational temperature of the battery. As a result, the battery was traditionally limited to the exterior walls of the vehicle body or as discussed in WO 2019/206440 (Autostore Technology AS) laterally mounted to the side of the container receiving space so as to permit heat from the batteries to dissipate to the external surroundings and thereby, prevent excessive thermal runaway during charging. Since the battery represents a significant proportion of the weight of the load handling device, the position of the battery in the vehicle body also has an influence on the stability of the load handling device in an upright position on the grid. Thus, there is a balance between making sure that the operational temperature of the battery is within the workable range for the battery to perform at an optimal state and the stability of the load handling device in an upright position on the grid structure. Ideally, it would be preferential to have an optimal arrangement of the auxiliary and/or hardware components based on their individual weights to improve the stability of the load handling device. The ability to locate the battery amongst the other auxiliary electrical and other hardware components in the vehicle body of the load handling device is made possible in the present invention by integrating a thermal management system comprising a temperature regulating device in the battery. The cassette 143 provides a cavity for encapsulating the battery together with an integrated thermal management system comprising a temperature regulating device.

In the particular embodiment of the present invention, the term "battery" covers one or more battery cells electrically connected together to form a battery pack. The battery includes but are not limited to any rechargeable power sources. Examples of rechargeable power sources are Lithium-Ion battery, Nickel-Cadmium battery, Nickel-Metal Hydride battery, Lithium-Ion Polymer battery, Thin Film battery and Smart battery Carbon Foam-based Lead Acid battery. The present invention is not limited to a battery and other rechargeable power sources that is able to store charge and deliver power to the motors is applicable in the present invention, e.g. capacitors, supercapacitors, or a combination of a battery and a supercapacitor (hybrid system). In the particular embodiment of the present invention and for the purpose of explanation of the present invention, the rechargeable power source will be discussed with reference to a battery.

Not shown in FIGS. 11 and 12, is that the walls of the cassette comprise one or more vent holes. The vent holes allows cool air to circulate through the inside space of the cassette 143. The one or more vents can comprise one or more inlet vents and one or more outlet vents. Cool air is drawn through the one or more inlet vents and warm air is expelled from the one or more outlet vents. The interior space of the cassette can optionally comprise one or more channels (not shown) to allow air to flow through a tortious path around the inside space of the cassette to maximise airflow across the battery cells and therefore, maximise surface area exposure of the circulating air to take away the heat from the battery. For example, cool air can enter the battery through at least one inlet vent of the cassette, flows along the inside space or cavity of the cassette and warm air is taken away by exiting the at least one outlet vent. The at least one inlet and outlet vent can be formed in any of the walls of the cassette, e.g. bottom and top wall. One or more walls of the cassette can be perforated to provide the inlet and/or outlet vents. Airflow channels can be incorporated into the cassette so as to allow airflow to be guided through a tortious path around the battery cells.

To achieve a better cooling effect of the battery, the thermal management system comprises a temperature regulating device to regulate the temperature of the inside space of the cassette. By regulating the temperature of the inside space of the cassette, the temperature of the battery can be regulated to its optimal performance. In one particular embodiment of the present invention, the temperature regulating device comprises a fan. Through the rotation of the fan, the followability of air is accelerated through the inside space of the cassette such that the air quickly takes away the heat generated in the battery pack. This allows the battery cells to work in a stable temperature range, prolonging the service life of the battery cells in the battery pack. For the purpose of the present invention, the ideal temperature range for optimum performance of the battery is from 20° C. to 40° C. In the particular embodiment of the present invention shown in FIGS. 11 and 12, one or more cooling fans 164, 166 are mounted to the front wall of the cassette to effect the circulation of airflow through the inside space of the cassette. In the embodiment shown in FIG. 11, two fans, a first fan 164 and a second fan 166, are mounted to the wall of the cassette. The first fan 164 optionally draws cool air into the inside space of the cassette 143*a* and the second fan 166 extracts the warm air from the inside space of the cassette 143*b* to the external surrounding area. The first and second fans 164, 166 also improves the flowability of air around the inside space of the cassette such that the airflow quickly takes away the heat generated in the battery pack.

Also shown in FIG. 11, are one or more ducting 168, 170 mounted to the walls of the cassette 143*a* and having an opening to direct or guide the flow of air through the vents by the rotation of the fans 164, 166. The fans 164, 166 are mounted to the ducting 168, 170 such that air entering the fan is forced through the vents by being guided through the one or more of the ducts. Similarly, warm air extracted by the fan is guided through the duct and exits the fan. For the purpose of explanation of the present invention, the fan for drawing cool air into the ducting is termed an inlet fan and the fan for extracting warm air from the ducting is termed an outlet fan. As shown in FIG. 11, the inlet 164 and outlet 166 fans are respectively mounted to the ducting such that air is guided through the ducting. Optionally, the inlet and outlet fans can be respectively mounted in-line of the ducting.

The one or more ducts also allows air to be drawn from or expelled into different parts of the vehicle body. For example, in the case where cool air is drawn into the inside space of the cassette 143*a*, the ducting can be extended so as to draw air from the cooler areas of the vehicle body, i.e. away from the electrical and electronic auxiliary components. This prevents warm air being drawn into the one or more of the inlet vents. Similarly, in the case of the outlet vent, the ducting can be shaped so as to expel warm air to areas of the vehicle body away from the heat sensitive electronic components such as a processor or controller. This is possible where the fans are mounted in-line of the ducting.

The one or more ducting can be separately mounted to the cassette. Alternatively, the one or more ducting can be integrally formed with the cassette as a single or unitary body. Whilst, the inlet fan is configured to draw cool air into the inside space of the cassette and the outlet fan is configured to extract warm air from the inside space of the cassette, the converse is applicable in the present invention wherein the inlet fan draws in warm air into the inside space of the cassette and the outlet fan is configured to expel cool air from the inside space of the cassette. For example, in the chilled or frozen zones of the fulfilment center, warm air taken from the warm areas of the vehicle body can be used to raise the temperature of the battery to the optimum temperature range of the battery, i.e. between 20° C. to 40° C. Heat dissipated from the motors of the lifting mechanism and/or driving assembly and/or auxiliary electronic components can be harvested or used to warm the batteries to the optimal temperature range. The direction of rotation of the inlet and outlet fans can optionally be reversed so that their roles to draw or expel air from the inside space of the cassette can be reversed depending on the air temperature in the different parts of the vehicle body. For example, different parts of the vehicle body can get warmer or cooler in comparison to other parts within the body and is dependent on whether the opening of the ducting is near any auxiliary electronic components or motors. The rotational directional of the one or more fans can reversed depending on whether cool air needs to be drawn into the inside space of the cassette or expelled from the inside space of the cassette.

Figure 13:
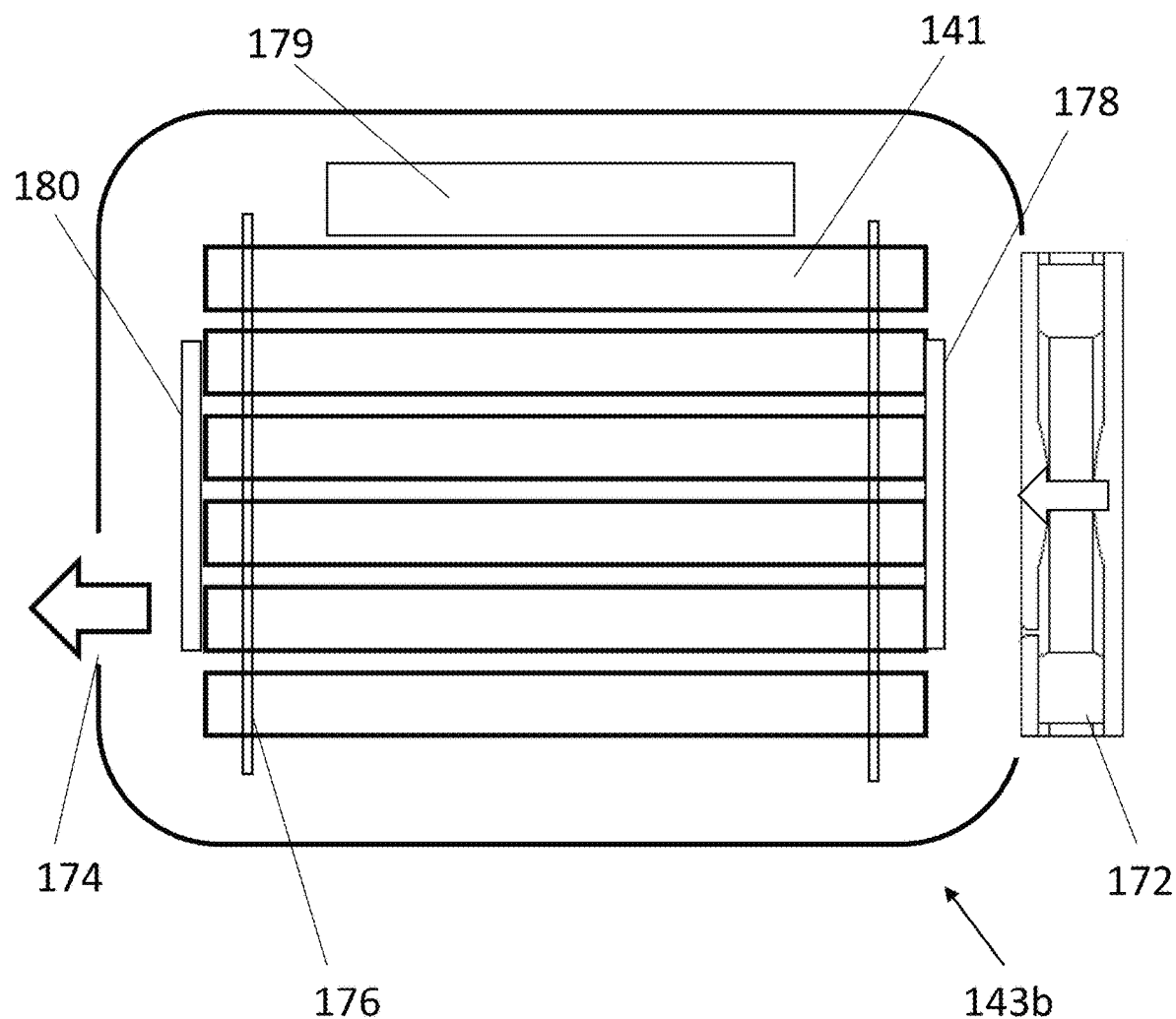
FIG. 13 is a schematic view of an example of the battery cassette housing the battery cells according to an embodiment of the present invention.

Whilst the particular embodiment shown in FIG. 11 shows two fans mounted to the front wall of the cassette, a single fan 172 can be used to circulate cool air through the inside space of the cassette 143*b* as shown in FIG. 12 and the schematic cross-sectional drawing in FIG. 13. Here, a single fan 172 mounted to the wall of the cassette 143*b* draws in cool air from the external surrounding into the inside space of the cassette where it is circulated to regulate the temperature of the battery cells 141 and warm air is expelled through one or more vent holes 174. Also shown in FIG. 13 and can be representative of the battery in FIG. 11, is multiple battery cells 141 assembled in a stack, one on top of the other and electrically connected together either in series or in parallel. When connected in series, the positive terminal of one battery cell is connected to the negative terminal of the next, and so on to arrange the battery cells in a stack. The links between the electrical connections of adjacent battery cells are provided by bus bars 176, which may comprise a conductor such as copper. Each of the battery cells 141 are spaced art so as to permit airflow between the battery cells. For example, one or more spacers (not shown) can be disposed between each of the battery cells. The battery cells are held together in the stack by the bus bars 176. The battery cells 141 are shown as elongated battery cells. However, the present invention is not limited to the battery cells being elongated cells but can be cylindrical cells that are assembled together and contained within the cassette 143*b*.

To encourage heat dissipation from the battery cells 141, a heat sink (not shown) can be thermally coupled to the battery to transfer heat generated from the battery to the external surroundings. The heat sink is typically made of aluminium or copper and can comprise fins to dissipate the heat generated from the battery cells. To further promote heat dissipation from the heat sink, the one or more fans can direct cool air across the fins of the heatsink or alternatively, a separate cooling fan can be mounted to the heatsink, more specifically, to the fins of the heat sink, so as to increase the flow of cool air around the fins.

Whilst the particular embodiment describe the temperature regulating device as a fan, other temperature regulating devices to regulate the temperature of the battery is applicable in the present invention. In addition to the cooling of the battery, the converse is true in the cold environments such as in the chilled or frozen zones of the fulfilment center, where the temperature of the battery falls too low to prevent optimal performance of the battery, particularly during charging. One or more heating elements, e.g. electrical heating elements, can be used to raise the temperature of the battery to within the predetermined temperature range corresponding to the workable temperature range of the battery, i.e. between 20° C. and 40° C. For example, the heating element can be a heating pad.

To provide both cooling and/or heating, the temperature regulating device can be a thermoelectric converter comprising one or more Peltier elements which generates heat and/or cooling based on the electrical current through the Peltier element. In brevity, a Peltier element provide both thermoelectric cooling and heating and typically comprises two unique semiconductors, one n-type and one p-type. The alternating p & n-type semiconductor pillars are placed thermally in parallel to each other and electrically in series and then joined with a thermally conducting plate on each side, usually ceramic removing the need for a separate insulator. When a voltage is applied to the free ends of the two semiconductors there is a flow of DC current across the junction of the semiconductors causing a temperature difference. The side with the cooling plate absorbs heat which is then transported by the semiconductor to the other side of the device, i.e. its brings heat from one side (heat absorbing side) to the other side (heat radiating side) so that the heat absorbing side gets cooler while the heat radiating side gets hotter. The polarity across the Peltier element can be reversed so that the current can flow in the opposite direction so reversing the heat absorbing side and the heat radiating side of the Peltier element. The Peltier element can draw power from the battery or a separate power source. This allows the same Peltier element to provide both heating and cooling of the battery cells.

When used as a cooling device, the surface of one or more battery cells is located in thermal contact with the heat absorbing surface of the Peltier element. Conversely, when used as a heating device, the surface of one or more battery cells are located in thermal contact with the heat radiating surface of the Peltier element. In the particular embodiment of the present invention shown in FIG. 13, two Peltier elements, a first Peltier element 178 and a second Peltier element 180, are shown arranged on the left and right side of the battery stack and directly in contact with the battery stack so as to provide both heating and/or cooling of the battery stack. For example, the first Peltier element 178 can be arranged so that the heat absorbing surface is in thermal contact with the battery stack to provide cooling of the battery stack and the second Peltier element 180 can be arranged so that the heat radiating surface is in thermal contact with the battery stack to provide heating of the battery stack. Heating and/or cooling of the battery stack is not limited to two Peltier elements and can be provided by a single Peltier element where heating and/or cooling is provided by reversing the polarity of the current through the single Peltier element, i.e. by use of a suitable switch.

Since, the ability to remove heat from the heat radiating side of the Peltier element improves the effectiveness of the Peltier element to cool the battery, one or more fans can direct cool air to the heat radiating side so as to encourage the heat absorbing side of the Peltier element to remain cool. Additionally, a heat sink can be mounted to the heat radiating side to effect heat dissipation from the heat radiating side of the Peltier element. To further encourage heat dissipation from the heat radiating side, one or more cooling fans can take away heat from the heat sink mounted to the heat radiating side of the Peltier element.

The amount of heating or cooling of the battery can be controlled by the magnitude or the duration of the current through the Peltier element. For example, by switching the power to the Peltier element either completely on or completely off and thus, the pulsing of the current through the Peltier element, the heating or cooling of the respective heating radiating side and the heat absorbing side can be regulated. The Peltier element can be driven by a Peltier driver. The Peltier driver can be a voltage source, a current source, relay or a transistor. The relay or transistor is used to switch the power to the Peltier element either completely on or completely off. Alternatively, a pulse-width modulator (PWM) can be used to regulate the switching of the power to the Peltier element on or off. The PWM output signal can consist of a periodic square wave with a variable "on time". This "on time", when expressed as a percentage of the period of the square wave, is known as the duty cycle. Power to the Peltier element can be adjusted by varying the duty cycle of the square wave. Further detail of the function of the Peltier element to regulate the temperature of the battery is discussed below.

Figure 14:
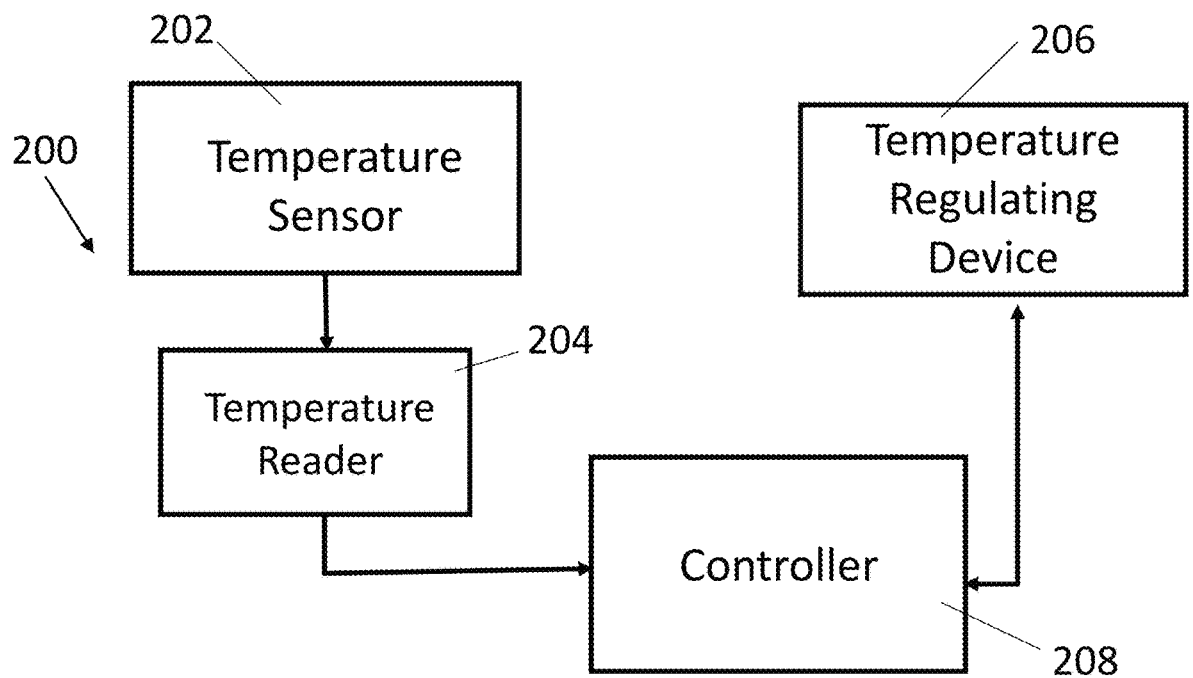
FIG. 14 is a simplified block diagram of the thermal management system of the battery according to one embodiment of the present invention.

Turning back to the components of the thermal management system and not shown in FIG. 13 is the thermal management system comprises one or more temperature sensors disposed in the cassette in close proximity to the battery, more specifically between the battery cells, to measure the temperature of the battery. The signal from one or more temperature sensors are read by a temperature reader and used to regulate the temperature regulating device. A temperature reader 204 reads and interprets the indications of temperature provided by the one or more temperature sensors 202 and generates a temperature signal which is fed back to a controller 208 as shown in FIG. 14. The temperature sensors 202 can be any type of temperature measurement known in the art to measure the temperature of the rechargeable power source, in this case, the battery. For example, the temperature sensor can be but is not limited to a thermistor, e.g. NTC thermistor or PTC thermistor, or a thermocouple, e.g. K type thermocouple. Also shown in FIG. 13, is a thermal management system 179 comprising a controller for controlling the at least one temperature regulating device 172 housed within the cassette. However, the controller need not be housed within the cassette and can be housed within the body of the load handling device. A communication port (not shown) can be present on the cassette to communicatively couple with the controller external of the cassette.

FIG. 14 illustrates a simplified block diagram of the thermal management system 200 according to a first embodiment of the present invention. The output from the temperature sensor 202 is fed into the temperature reader 204, which interprets the output to provide a temperature signal. The temperature signal provides an indication of the temperature of the battery. One or more temperature sensors 202 can be disposed between the battery cells to provide a more accurate measurement of the temperature of the battery. The temperature reader 204 sends the temperature signals to the controller 208 which uses the temperature signals to drive the temperature regulating device 206 to regulate the temperature of the battery to within a predetermined temperature range. The predetermined range is within the workable range of the battery, i.e. between 20° C. and 40° C. Beyond 40° C., the performance of the battery to hold charge decreases. One or more flags can be set up to inform the user that the temperature of the battery is outside its ideal workable range. For example, one or more flags can be set up where the controller 208 will inform the operator when the temperature reading from one or more temperature sensors 202 reaches 65° C. which is an indication of over temperature and 80° C. which is an indication of thermal runaway. On the cooler side, the controller can inform the operator when the temperature reading from the temperature reading records a reading of −80° C. indicative of possible failure as a result of the electrolyte of the battery freezing.

In response to the signal from the temperature sensor 202, the controller 208 can then instruct one or more temperature regulating devices 206 to regulate the temperature of the battery. As discussed above, the temperature regulating device 206 can be one or more fans, one or more heating elements and/or one or more thermoelectric convertors, e.g. Peltier elements so as to maintain the temperature of the battery within the workable range. The controller 208 can be any processing device known in the art. Typical examples include but are not limited to a microprocessor. The processor can be communicatively coupled to a computer readable media such as a memory device. The memory can be any storage device commonly known in the art and include but is not limited to a RAM, computer readable medium, magnetic storage medium, optical storage medium or other electronic storage medium which can be used to store data and instructions accessed by the processor. The one or more processor of the controller can execute instructions stored in the ROM and/or RAM to regulate the temperature of the battery in response to the temperature signals from the temperature reader 204. The controller 208 can form part of the thermal management system 200 of the present invention and therefore, contained within the cassette or outside of the cassette, e.g. in the body of the load handling device. For example, the thermal management system may comprise a communication module that is able to communicate wirelessly over a network. The network may comprise a local area network (LAN), a wide area network (WAN) or any other type of network. Temperature signals and instructions to regulate the temperature regulating device 208 can be sent wirelessly over a network to an externally located controller. The controller may be contained with the vehicle body or alternatively, separate to the vehicle body. In addition to the at least two charge receiving terminals discussed above, a third connection may be present on the vehicle body that is communicatively coupled to the temperature reader 204 and the temperature regulating device 206 to not only communicate and receive signals about the health of the battery but also to communicate signals about the temperature of the battery as well as to receive signals from the controller 208 to actuate the at least one temperature regulating device 206. The controller can comprise a PID (Proportional, Integral, Derivative) or PI (Proportional, Integral) controller to regulate the temperature of the battery to within a set point temperature by controlling the operation of the at least one temperature regulating device.

Figure 15:
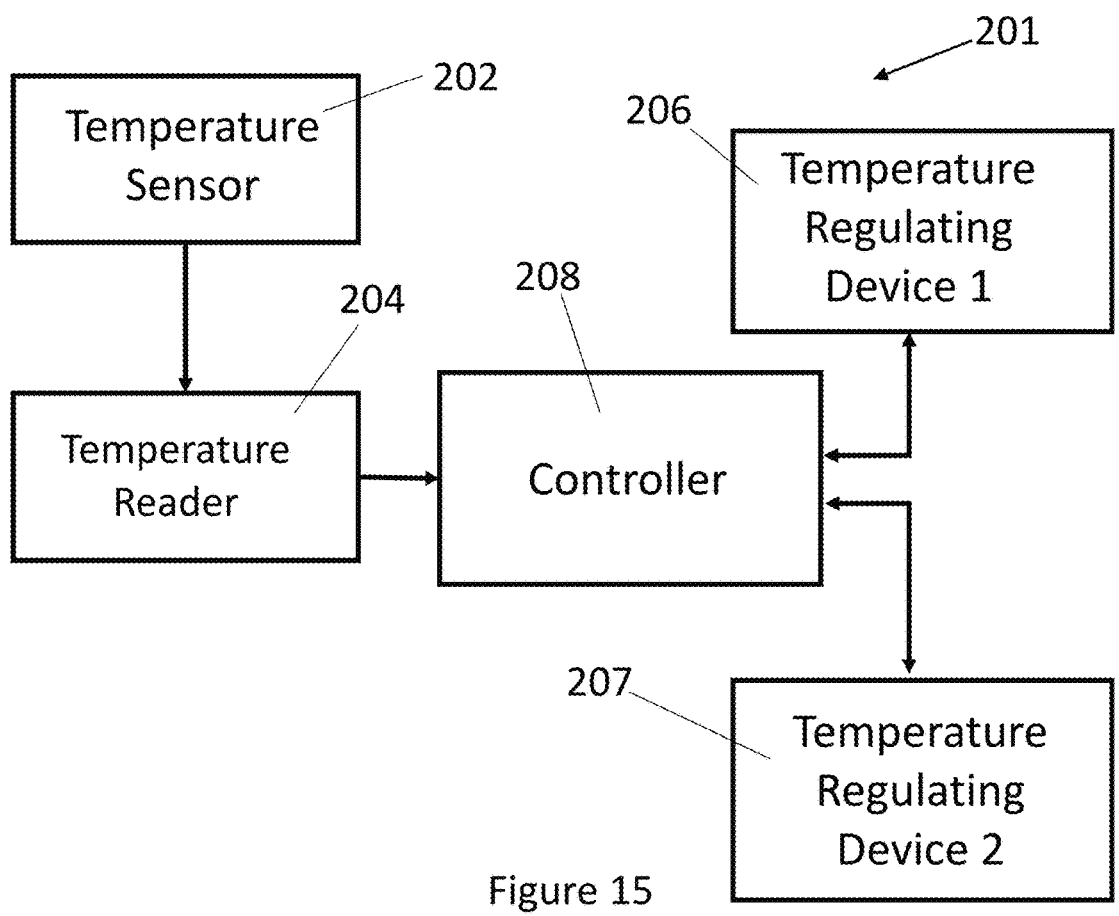
FIG. 15 is a simplified block diagram of the thermal management system of the battery according to another embodiment of the present invention.

In the first embodiment of the present invention, the controller 208 is configured to actuate the temperature regulating device 206 in response to the temperature signal from the temperature reader 204 being outside the workable temperature range. For example, in the case where the temperature is high, the controller actuates the operation of one or more cooling fans until the temperature of the battery falls within the workable range. As discussed above, the controller can control the speed and direction of rotation of the fan to control the degree of cooling to the battery contained within the cassette. A heat sink can be used in combination with the fan to encourage heat dissipation from the battery. Conversely, where the temperature of the battery is too low, the controller 208 can actuate the heat element to raise the temperature of the battery. The controller can be instructed to actuate more than one temperature regulating devices as shown in FIG. 15 to regulate the temperature of the battery. These include but are not limited to one more fans, heating element and/or one or more thermoelectric convertors (Peltier element). The controller can comprise a PID controller (proportional, integral and proportional) to regulate the temperature of the battery to a predetermined set point temperature.

In FIG. 15, the thermal management system 201 is shown to comprise a first and second temperature regulating device 206, 207. The first temperature regulating device 206 can be a cooling fan and the second temperature regulating device 207 can be a heating element. The controller 208 can regulate the temperature of the battery to be within the workable range by controlling the actuation of one or more fans and/or the heating element.

Figure 16:
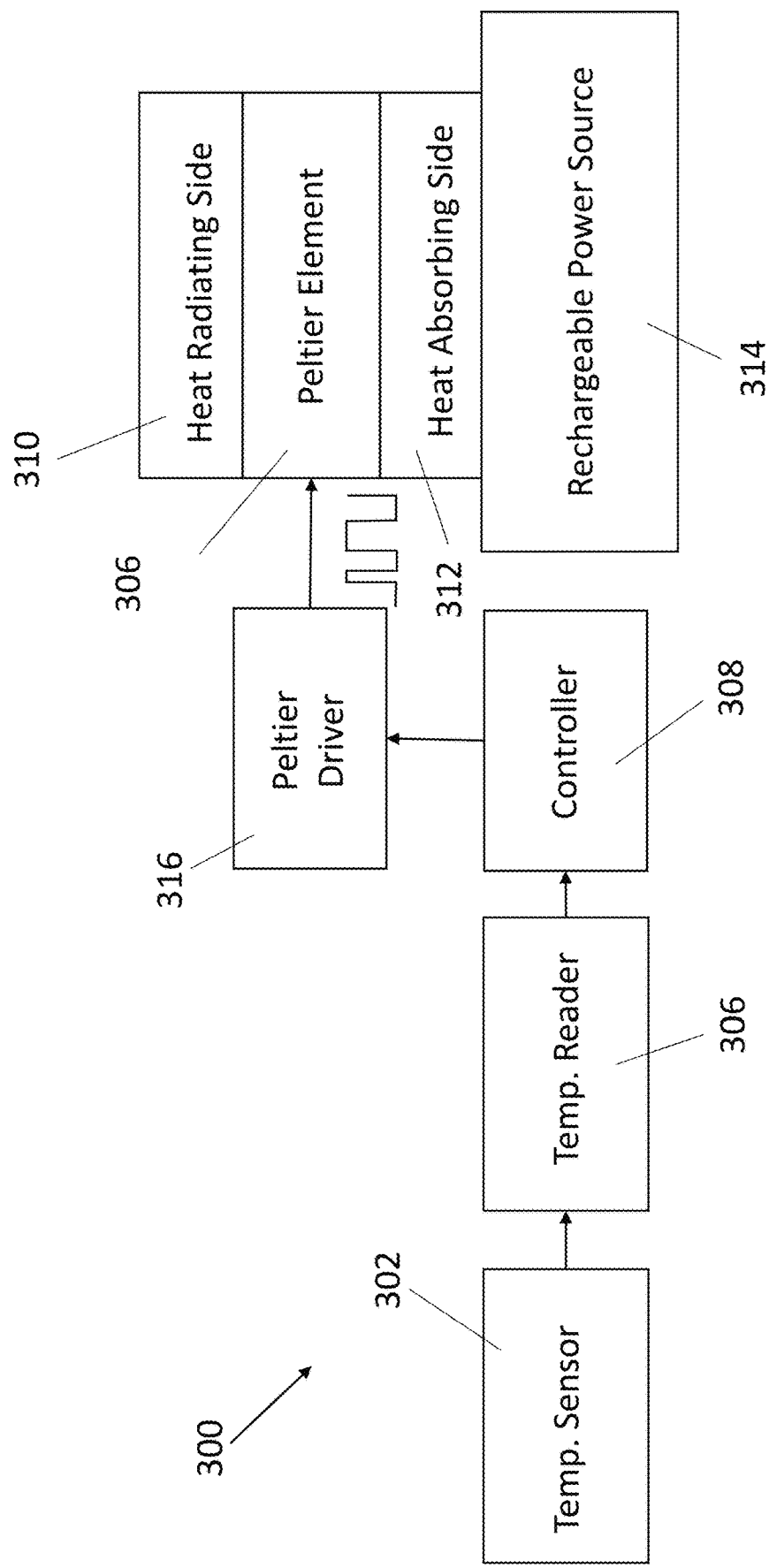
FIG. 16 is a simplified block diagram of the thermal management system incorporating a Peltier element according to an embodiment of the present invention.

FIG. 16 is an adaption of the simplified block diagram of the thermal management system shown in FIGS. 14 and 15 where the at least one temperature regulating device of the thermal management system 300 comprises a Peltier element 306. In the particular embodiment shown in FIG. 16, the heat absorbing side 312 or cooling side of the Peltier element 306 is in direct contact with the rechargeable power source 314, e.g. battery, so that the heat generated by one or more battery cells of the battery is thermally conducted to the heat absorbing side of the Peltier element 306. The physical contact between the battery and the heat absorbing side of the Peltier element helps to keep the battery cool. In another embodiment of the present invention, a conducting plate (not shown) can be disposed between the heat absorbing side 312 of the Peltier element 306 and the battery 314. The controller 308 is configured to control a Peltier Driver 316 to drive the at least one Peltier element 306. The Peltier driver 316 can be a voltage source, a current source used to drive the at least one Peltier element or a connection to the power supply of the battery or of another power source. Cooling of the heat absorbing surface can be controlled by the switching on and off the power to the at least one Peltier element 306. As discussed above, the Peltier driver 316 can comprises a pulse wave modulator (PWM) to generate pulses of power to drive the at least one Peltier element 316 and thereby, regulate the cooling of the heat absorbing surface. The duty cycle ("on" time of the Peltier element) of the square wave generated by the PWM can be varied by the controller to vary the power to the at least one Peltier element. The longer the duty cycle, the greater the cooling effect of the heat absorbing surface since the heat absorbing surface will remain cold for a longer period of time and thus, the cooling of the battery. Equally, the frequency of the square wave controls the number of "cooling bursts" from the Peltier element and thus, cooling of the battery. The controller 308 can be instructed to vary the duty cycle and/or the frequency of the duty cycle of the signal from the PWM to regulate the temperature of the battery. The controller can comprise a PID or PI controller to vary the duty cycle and/or the frequency of the signal from the PWM so that the temperature of the battery falls within a predetermined set point temperature.

As heat is transferred from the heat absorbing side to the heat radiating side of the at least one Peltier element, heat can optionally be taken away from the heat radiating side 310 by being arranged in thermal contact with a heat sink.

Additionally, the heat radiating side 310 of the at least one Peltier element can be disposed into the path of the air blown by the one or more fans and therefore, help the heat absorbing side of the at least one Peltier element to cool the battery more efficiently.

Not shown in FIG. 16 is that the polarity of the current through the at least one Peltier element can be reversed (direction of current reversed) so that the heat absorbing side becomes the heat radiating side to cause warming of the battery. This is particularly the case in the chilled or frozen section of the fulfilment center. As with the heat absorbing side (cooling side), the controller controls the Peltier driver to regulate the current to the at least one Peltier element to regulate the heating of the battery. Reversing the direction of the current through the at least one Peltier element allows a single element to effect both cooling and heating of the battery depending on the temperature signal from the temperature reader. Switching the polarity of the at least one Peltier element can be achieved using a relay or other suitable switch.

However, the heating and cooling of the battery can be provided by two separate Peltier elements; a first Peltier element for cooling of the battery and a second Peltier element for heating of the battery. The advantage of having a first and a second Peltier element to both heat and cool the battery is that the effectiveness to warm or cool the at least one Peltier element can be improved by treating the opposite faces of the Peltier element. In the case of cooling, the heat absorbing side can be improved by treating the heat radiating side to take away the heat from the heat radiating side, e.g. sink and/or fan. Similarly, the heat radiating side to warm the battery can be improved by insulating the heat absorbing side.

The present invention can also utilise the Seebeck effect of the thermoelectric convertor to determine the temperature of the battery. Current generated as a result of the temperature difference between the heating radiating side and heat absorbing side of the thermoelectric convertor can be used to determine the temperature of the battery, i.e. the temperature difference across the semiconductor. One face of the thermoelectric element can be exposed to ambient temperature and the opposing face of the thermoelectric convertor can be in thermal contact with the battery. The temperature difference between opposing faces of the thermoelectric convertor generates a current at the junction of the thermoelectric convertor which is read by the temperature reader to determine the temperature of the battery.

Whilst the particular embodiment of the present invention describes the thermal management system to be integrated into the cassette housing the rechargeable power source, the temperature of the rechargeable power source can be controlled externally of the cassette. In another embodiment of the present invention, the thermal management system can be integrated into the vehicle body of the load handling device. For example, the temperature sensor can comprise an infrared camera mounted within the vehicle body and configured to determine the temperature of the rechargeable power source by detecting the infrared energy emitted from the rechargeable power source. The temperature reading from the infrared camera can be used by the controller to actuate one or more temperature regulating devices described above in response to the temperature signal being outside the predetermined temperature range.

The thermal management system of the present invention can be powered by the rechargeable power source. Alternatively, the thermal management system of the present invention can be powered by the power delivered by a charge station whenever the rechargeable power source of the load handling device is being charged at the charge station. Power to the thermal management system include but is not limited to the temperature regulating device, and/or the temperature sensor and/or the controller. The charge station comprises a charge head which is configured to cooperate with a charge point on the load handling device. As the load handling device moves into a grid cell where the charge station is located, a contact is made between a charge contact pad on a top surface of the load handling device, and the charge contacts of the charge head. A charge is imparted to the load handling device from the charge contacts through the charge contact pad situated on the top surface of the load handling device. During charging of the rechargeable power source, a charge is imparted to the thermal management system of the present invention to power the components of the thermal management system. Typically, the charge station delivers a charge of around 160 amps at 48 volts. The likelihood of thermal runaway of the rechargeable power source is higher when charging of the battery than when the battery is discharging during operation of the load handling device on the grid structure. The internal resistance of the rechargeable power source, particularly a battery, varies with the temperature and increases at low temperatures. The likelihood of heating during charging of the battery increases in the chilled and/or the frozen section of the fulfilment center than any other areas of the fulfilment center. In a worst case scenario, would lead to thermal runaway and possible decomposition of the battery components. The thermal management system of the present invention becomes more important during charging of the battery. During charging of the rechargeable power source at the charge station, the thermal management system of the present invention can be used to monitor the temperature status of the battery and will actuate the one or more of the temperature regulating devices should the temperature of the rechargeable power source fall outside the predetermined temperature range. To preserve the charge in the rechargeable power source, the charge from the charge station can be used to deliver power to the thermal management system. The charge can be siphoned from the charge delivered to the rechargeable power source. Alternatively, a separate charge collector comprising at least two (positive and negative) charge collector contacts can be incorporated on the vehicle body that cooperate with corresponding charge providing contacts at the charge station to supply power to the thermal management system.

Different combinations of the temperature regulating device discussed above can be used to control the temperature of the rechargeable power source. For example, a Peltier element can be used in combination with one more cooling fans. The one or more temperature sensors can be thermocouple or a thermistor or other temperature sensor commonly known in the art or based on the semiconductor thermocouple Seebeck effect as discussed above. The temperature reader can be integrated into the controller where the voltage signals from the temperature sensor are interpreted by the controller to provide a temperature reading.

Stability of the Load Handling Device

During operation on the grid structure, the load handling device can accelerate up to 2 m/s$^2$ and reach a top speed of 4 m/s. Additionally, the load handling device can change direction in both the X-Y direction on the grid structure which can sometimes be abrupt. Thus, it is essential that the load handling device is stable on the grid structure since the forces encountered during acceleration and change in direction on the grid structure may cause it topple. To increase the stability of the load handling device, the center of mass of the load handling device is kept low as possible. There are various ways of achieving a low center of mass in the art. These include increasing the footprint of the body of the load handling device beyond the dimensions of a single grid cell so as to extend into an adjacent grid cell to placing the battery, which represent a large proportion of the weight of the load handling device, to the side of the container receiving space. However, the problem of having a load handling device where the footprint of the body of the load handling device occupies a space of a single grid cell of the grid structure (so called single cell load handling device) is the relatively instability of the load handling device on the grid structure. The problem of instability is exacerbated when the battery becomes large since the center of mass is raised, i.e. a higher center of gravity. Where the load handling device is influenced by a gravitational field, the center of mass is equivalent to the center of gravity of the load handling device. Thus, the location of the center of mass and center of gravity are equivalent.

Figure 17:
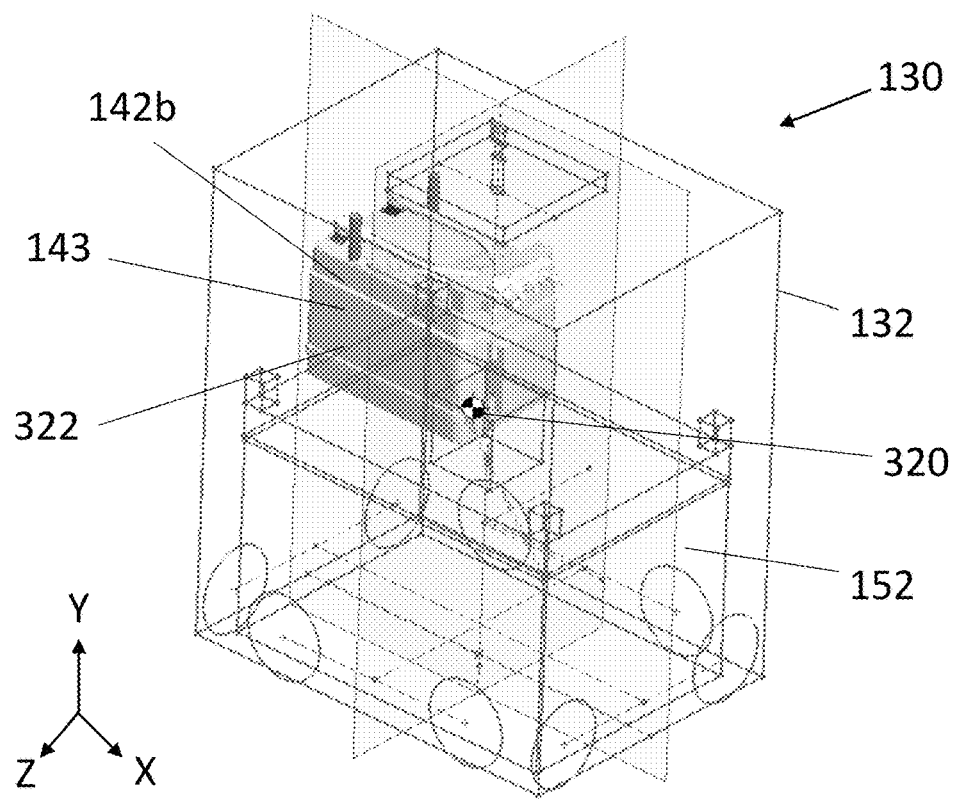
FIG. 17 is schematic view of the load handling device showing the position of the battery cassette in the vehicle body according to the embodiment of the present invention.
Figure 18:
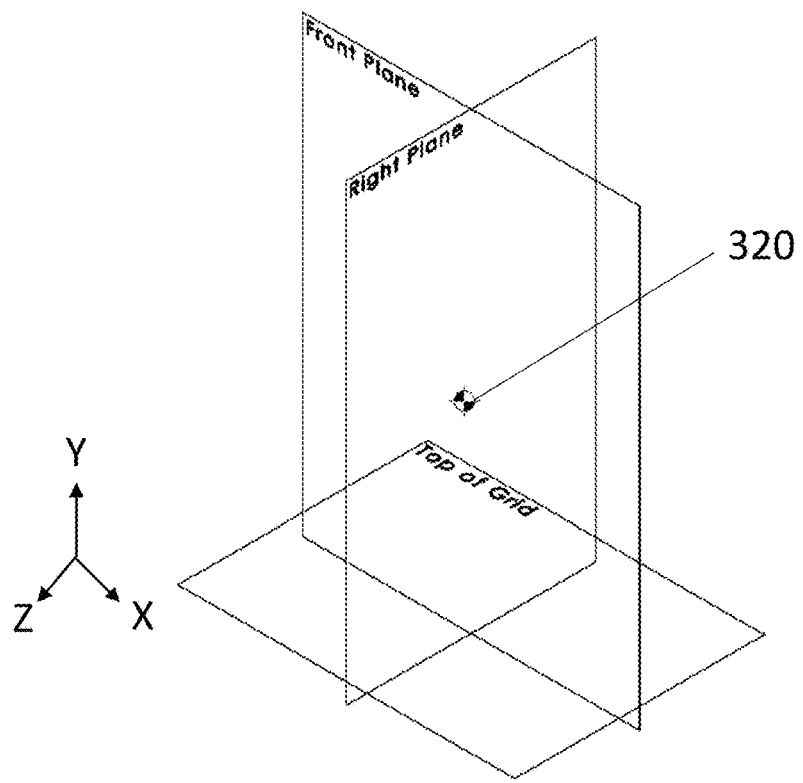
FIG. 18 showing the location of the center of mass of the load handling device in relation to the intersecting planes of the load handling device on the grid structure.

In the particular embodiment of the present invention with reference to FIGS. 6 to 10 and FIG. 17-19, the cassette 143 of the present invention is positioned in the vehicle body 132 such that the center of mass 320 of the load handling device (indicated by the dot in FIG. 17) is in the space occupied by the cassette. For the purpose of the present invention, measurement of the center mass is made relative to the center point of the vehicle body. In 3 Dimensions, the center point of the load handling device represented by the Cartesian coordinates, X, Y, Z, shown in FIG. 17 and FIG. 18 is 0, 0, 0. The location of the center of mass is indicated in FIG. 18 as a small dot 320 along the intersection of two perpendicular planes through the body of the load handling device. As indicated in FIG. 17 and for the purpose of explanation of the present invention, the Y direction is along the Y axis and extends in a vertical direction. The X and Z directions extend in transverse directions in the horizontal plane. Thus, the coordinates in the Y direction determines the point whether the center of mass is above the first space or below the first space—the first space being the container receiving space. The labelling of the X, Y and Z axis is shown in FIG. 17 but can be different, e.g. the Z axis can be the Y axis in which case the coordinates in the Z direction determine the position of the center of mass in the vertical direction.

In the particular embodiment of the present invention, the cassette 143 housing the rechargeable power source is located directly above the first space 152 for accommodating the container. By positioning the cassette directly above the first space 152 for accommodating the container, the center of mass 322 of the load handling device is in the second space 142b that accommodates the cassette. Whilst not perfect, improves the stability of a single cell load handling device operative on the grid structure since the cassette is directly above the first space. By positioning the battery directly above the first space and substantially centrally between opposing side walls of the vehicle body, a shift in the center of mass of the load handling device when the load handling device is carrying a payload become less dramatic.

Table 1 below shows the coordinates of the center of mass of the load handling device as defined by the displacement of the center of mass from the center point of the load handling device. In the particular embodiment of the present invention, the mass of the cassette housing a battery is in the range 30 kg to 35 kg. Position 1 in Table 1 represents the center of mass of the load handling device without the cassette. In the particular embodiment of the present invention, the center of mass of the load handling device without the cassette is in the first space for accommodating the container. Thus, the load handling device is more stable without the cassette. Whilst the mass of the cassette when installed in the vehicle body would raise the center of mass and therefore, affect the stability of the load handling device, the particular position of the cassette substantially centrally between the opposing side walls of the vehicle body had lessen this impact. In the particular embodiment of the present invention, the cassette is located substantially centrally of the opposing side walls of the vehicle body and mounted on a tray directly above the first space as described with reference to FIGS. 6 to 10. When the cassette is installed in the vehicle body, the location of the center of mass as indicated by the Y coordinates from Position 2 and 3 in Table 1 moves up to the second space, i.e. into the second space directly above the first space. The location of the center of mass lowers when the load handling device is carrying a payload as indicated in Positon 4 of Table 1. In this case, the location of the center of mass moves down to the first space making the load handling device more stable on the grid structure. Thus, the center of mass of the load handling device changes between being in the second space and the first space depending on whether the load handling device is carrying a container with a payload. By locating the center of mass within the battery receiving space (second space), the stability of the load handling device is thus determined by the position of the battery in the vehicle body. Placing the battery as low as possible in a vertical direction as determined by the Y coordinates improves the stability of the load handling device on the grid structure. Since the first space is configured for accommodating the container during operation of the load handling device in the storage system, in the particular embodiment of the present invention, the battery is positioned in close proximity in a vertical direction above the first space, i.e. directly above the first space. Any movement or adjustment of the center of mass is minimised by locating the battery directly above the first space. This reduces the impact on the instability of the load handling device when installing the battery in the vehicle body. In the particular embodiment of the present invention, installing the battery directly above the first space changes the center of mass to the second space, i.e. the battery containing space.

Figure 19:
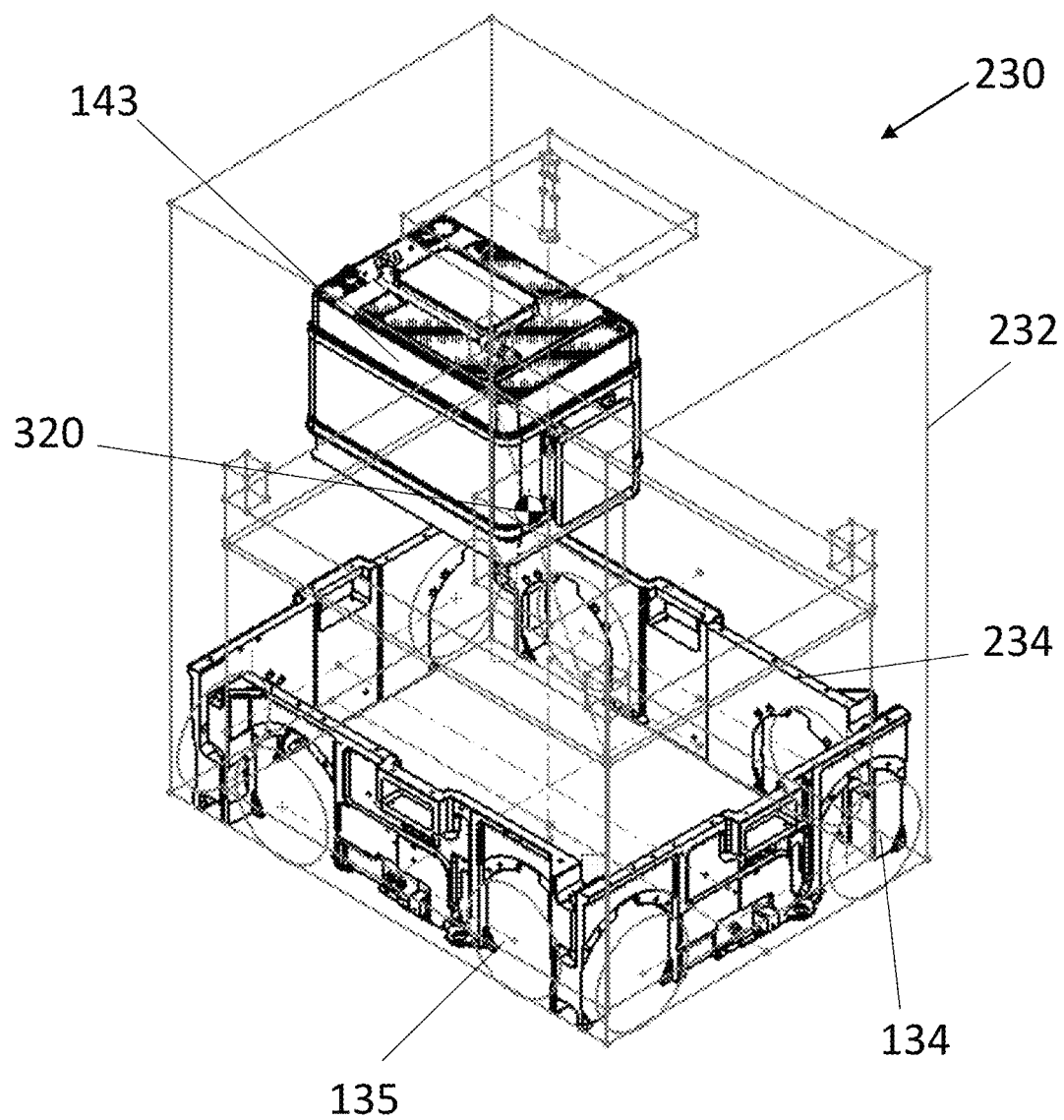
FIG. 19 is a schematic view of the load handling device showing the chassis for mounting of the wheel assembly according to an embodiment of the present invention.

To further improve the stability of the load handling device on the grid structure, the load handling device comprises a lower portion and an upper portion. The cassette is mounted in the upper portion of the load handling device and the wheel assembly comprising the first and second set of wheels are mounted in the lower portion of the load handling device. The load handling device 230 further comprises a chassis or frame comprising weights 234 in the lower portion of the load handling device. In the particular embodiment of the present invention, the weights 234 are wheel mounting plates. The first and second set of wheels 134 are mounted to the wheel mounting plates 234 as shown in FIG. 19. The wheel mounting plates 234 are fabricated such that the weight of the chassis or frame is concentrated towards the lower portion of the load handling device. Not shown in FIG. 19, is the vehicle body comprises side panels that are mounted to the chassis.

In the particular embodiment of the present invention shown in FIG. 19, the wheel mounting plates 234 represent a separate part of the vehicle body 232 and comprises heavy metal plates, e.g. by increasing the thickness of material used to fabricate the wheel mounting plates and/or the type of material used. The wheel mounting plates 234 shown in FIG. 19 comprises first and second pairs of opposing metal plates for respectively mounting the first and second sets of wheels 134, 135. The weight of the wheel mounting plates is greater than the weight of the cassette 143 housing the rechargeable power source. By concentrating the weight of the load handling device 230 towards the lower portion of the load handling device, e.g. at the base or foot of the load handling device, the stability of the load handling device is improved and compensates for the weight of cassette above the first space in a single cell load handling device.

Alternatively, the chassis or frame of the load handling device comprises an upper portion and a lower portion; wherein the cassette 143 is mounted in the upper portion of the chassis and the wheel assembly is mounted in the lower portion of the chassis. The mass of the chassis in the lower portion is greater than the mass of the chassis in the upper portion.

Whilst the stability of the load handling device with reference to FIGS. 6 to 10 and FIG. 17-19, describes a cassette housing the rechargeable power source, the same effect can be achieved when installing the rechargeable power source alone directly above the first space such that the center of mass is in the second space, i.e. the second space is not just limited to accommodating a cassette but can be a rechargeable power source alone. As discussed above the rechargeable power source can be a battery or a super-capacitor or both. Whilst the description describes a cassette, the battery alone can also represent a significant proportion of the weight of the load handling device and therefore, able to affect the stability of the load handling device where the footprint of the load handling device occupies a single grid cell. Thus, having the center of mass in the second space for accommodating the cassette also applies where the second space is accommodated by a battery.

TABLE 1

Coordinates of the Centre of Mass of the Load Handling Device defined by the displacement from the centre point (0, 0, 0) of the Load Handling Device.

| Position | Condition of the Load Handling Device | Centre of Mass | | |
|---|---|---|---|---|
| | | X | Y | Z |
| 1 | Without Battery and no container | 28.29 | 427.59 | −0.98 |
| 2 | With Battery and no container | −12.70 | 482.78 | 5.69 |
| 3 | With Battery and empty container | −12.39 | 474.44 | 5.55 |
| 4 | With Battery and Payload Tote | −10.80 | 441.06 | 4.84 |

Further aspects of the invention may be described with reference to the following numbered clauses:

Clause 1. A load handling device 30 for lifting and moving one or more containers 10 stacked in a storage system comprising a grid framework structure 14 supporting a plurality of tracks arranged in a grid pattern to define a grid structure 15 above the one or more stacks 12 of containers, the grid pattern comprising a plurality of grid cells 17, the load handling device 30 comprising:

A) a driving mechanism operatively arranged for moving the load handling device 30 on the grid structure 15,
B) a vehicle body 132 housing:
   i) a container receiving space 152 located above the tracks;
   ii) a lifting device comprising a lifting drive assembly 140 and a grabber device 39 configured, in use, to releasably grip a container 10 and lift the container 10 from the stack 12 into the container receiving space 152,
   iii) a cassette 143 housing a rechargeable power source 142 for powering the driving mechanism;

wherein the load handling device 30 comprises a thermal management system 200 comprising a temperature sensor 202 and at least one temperature regulating device 206 configured to maintain the temperature of the rechargeable power source 142 within a predetermined temperature range in response to a signal from the temperature sensor 202.

Clause 2. The load handling device 30 of clause 1, wherein the at least one temperature regulating device 206 comprises at least one cooling fan.

Clause 3. The load handling device 30 of clause 2, wherein the at least one cooling fan comprises a first cooling fan 164 for supplying cool air to the inside space of the cassette and a second cooling fan 166 for extracting warm air from the inside space of the cassette.

Clause 4. The load handling device 30 of clause 2 or 3, wherein the thermal management system further comprises a heat sink thermally coupled to the rechargeable power source 142, said heat sink comprising a plurality of heat dissipating fins and wherein the at least one cooling fan is configured for blowing cool air across the heat dissipating fins.

Clause 5. The load handling device 30 of any preceding clause, wherein the cassette 143 comprises one or more vents.

Clause 6. The load handling device 30 of any preceding clause, wherein the temperature regulating device 206 comprises at least one heating element in proximity to the rechargeable power source 142 and contained within the cassette 143.

Clause 7. The load handling device 30 of any preceding clause, wherein the at least one temperature regulating device 206 comprises at least one thermoelectric device.

Clause 8. The load handling device 30 of clause 7, wherein the at least one thermoelectric device comprises at least one Peltier element 306 having a heat absorbing surface and a heat radiating surface that are opposite each other.

Clause 9. The load handling device 30 of clause 8, wherein the at least one Peltier element 306 is configured for selectively cooling and/or heating the rechargeable power source 142 by means of switching polarity.

Clause 10. The load handling device 30 of clause 8, wherein the at least one Peltier element 306 comprises a first Peltier element and a second Peltier element, the first Peltier element being arranged such that the heat absorbing face of the first Peltier element is in proximity to a first portion of the rechargeable power source and the second Peltier element being arranged such that the heat radiating face is in proximity to a second portion of the rechargeable power source 142.

Clause 11. The load handling device 30 of any of the clauses 8 to 10, wherein the heat radiating surface of the at least one Peltier element 306 is thermally coupled to a heat sink.

Clause 12. The load handling device 30 of clause 11, further comprising a fan configured for blowing air at the heat sink.

Clause 13. The load handling device 30 of any of the clauses 8 to 12, wherein the at least one Peltier element 306 is driven by a Peltier driver 316.

Clause 14. The load handling device 30 of clause 13, wherein the Peltier driver 316 comprises a pulse width modulator for regulating the current to the at least one Peltier element 306.

Clause 15. The load handling device 30 of any of the preceding clauses, wherein the thermal management system 200 further comprises a controller 208 coupled to the temperature sensor 202 and the at least one temperature regulating device 206, said controller 208 being configured to regulate the temperature reading of the temperature sensor 202 to within the predetermined temperature range.

Clause 16. The load handling device 30 of any of the preceding clauses, wherein the rechargeable power source 142 comprises at least one of a battery and/or a capacitor, each of the at least one of a battery and/or capacitor comprising a plurality of cells.

Clause 17. A storage system comprising:
- a first set of tracks 22a and a second set of tracks 22b running transversely to the first set of tracks 22a in a substantially horizontal plane to form a grid pattern 15 comprising a plurality of grid spaces or grid cells 17;
- a plurality of stack of containers 12 located beneath the first set of tracks 22a and second set of tracks 22b, wherein each of the stack of containers 12 occupies a single grid space or grid cell,
- a load handling device 30 as described in any of the clauses 1 to 16 arranged to traverse along the first set 22a and the second set 22b of tracks over the plurality of grid spaces or grid cells 17 such that when positioned above a stack of containers 12 occupying a grid space or grid cell 17, the lifting device is configured to lift at least one container 10 from said stack of containers 12.

The invention claimed is:

1. A load handling device for lifting and moving one or more containers stacked in a storage system with a grid framework structure supporting a plurality of tracks arranged in a grid pattern to define a grid structure above the one or more stacks of containers, the grid pattern having a plurality of grid cells and each of the one or more stacks of containers being located within a footprint of only a single grid cell, the load handling device comprising:
   A) a driving mechanism configured and operatively arranged for moving the load handling device on the grid structure;
   B) a drive assembly comprising a wheel assembly having a first set of wheels arranged for moving the load handling device in a first direction and a second set of wheels arranged for moving the load handling device in a second direction; and
   C) a vehicle body having a footprint that, in use, occupies substantially only a single grid cell in the storage system, said vehicle body housing:
      i) a rechargeable power source for powering the driving mechanism;
      ii) a first space and a second space, the first space being configured for accommodating a container and the rechargeable power source being housed in the second space; and
      iii) a lifting device including a lifting drive assembly and a grabber device configured, in use, to releasably grip a container and lift the container from the stack into the first space,
   wherein the vehicle body comprises a chassis, wherein said chassis comprises wheel mounting plates, said wheel assembly being mounted to the wheel mounting plates, and wherein a mass of the wheel mounting plates is greater than a mass of the rechargeable power source, such that a center of mass of the load handling device is in the second space.

2. The load handling device of claim 1, wherein the center of mass of the load handling device is off center from a center point of the load handling device by −10 mm to −13 mm in an X direction, 440 mm to 490 mm range in a Y direction, and 4.5 mm to 6 mm range in a Z direction.

3. The load handling device of claim 2, in combination with a container, wherein the first space accommodates the container such that the center of mass of the load handling device is displaced off center from the center point of the load handling device by −12 mm to 13 mm in the X direction, 470 mm to 475 mm in the Y direction, and 5.0 mm to 5.6 mm in the Z direction.

4. The load handling device of claim 3, wherein the container comprises:
   a payload having a weight of approximately 35 kg such that the center of mass of the load handling device is displaced off center from the center point of the load handling device by −10 mm to 11 mm in the X direction, 440 mm to 450 mm in the Y direction, and 4.5 mm to 5.0 mm in the Z direction.

5. The load handling device of claim 1, wherein the rechargeable power source is configured and arranged to displace the center of gravity of the load handling device by 40 mm to 45 mm in an X direction, 50 mm to 60 mm in a Y direction, and 5 mm to 7 mm in a Z direction.

6. The load handling device of claim 1, wherein the rechargeable power source is mounted substantially centrally between a pair of opposing sidewalls of the vehicle body.

7. The load handling device of claim 6, wherein the lifting device comprises:
   a first pair of spools separately carrying a first pair of lifting tethers and a second pair of spools separately carrying a second pair of lifting tethers, the first and second pair of spools being arranged to be driven by the lifting drive assembly to raise or lower the grabber device relative to the vehicle body, and wherein the first pair of spools is spaced apart from the second pair of spools so as to define the second space such that the rechargeable power source is partially located between the first pair of spools and the second pair of spools.

8. The load handling device of claim 7, wherein the rechargeable power source and the lifting drive assembly are mounted in a same horizontal plane.

9. The load handling device of claim 7, wherein the rechargeable power source and the lifting drive assembly are mounted on a tray.

10. The load handling device of claim 1, wherein the second space is accessible from an exterior side of the vehicle body such that the rechargeable power source is removable from an exterior side of the vehicle body.

11. The load handling device of claim 10, wherein the rechargeable power source is configured to be removable from the vehicle body by pulling from a first face of the rechargeable power source.

12. The load handling device of claim 11, wherein the lifting drive assembly is mounted adjacent a second face of the rechargeable power source, the second face being opposite the first face.

13. The load handling device of claim 1, wherein the rechargeable power source is mounted on rails.

14. The load handling device of claim 1, wherein the vehicle body comprises:

walls on all sides and forms a quadrilateral footprint that, in use, substantially occupies only a single grid cell in the storage system.

15. The load handling device of claim 1, wherein the chassis has an upper portion and a lower portion, the rechargeable power source being mounted in the upper portion and the wheel assembly being mounted in the lower portion, and wherein a mass of the chassis in the lower portion of the chassis is greater than a mass of the chassis in the upper portion.

16. The load handling device of claim 1, wherein the wheel mounting plates comprise:

a first pair of opposing plates and a second pair of opposing plate such that the first set of wheels are mounted to the first pair of opposing plates and the second set of wheels are mounted to the second set of opposing plates.

17. The load handling device of claim 1, wherein the rechargeable power source comprises:

a plurality of rechargeable power cells electrically connected together and housed in a casing to define a cassette.

18. The load handling device of claim 17, wherein the rechargeable power cells comprise:

battery cells.

19. A storage system comprising:

a first set of parallel tracks and a second set of parallel tracks running transversely to the first set of tracks in a substantially horizontal plane to form a grid pattern having a plurality of grid spaces or grid cells;

a plurality of stacks of containers located beneath the first set of parallel tracks and second set of parallel tracks, wherein each of the stacks of containers occupies a single grid space or grid cell; and a load handling device as claimed in claim 1, and arranged to traverse along the first set and the second set of tracks over the plurality of grid spaces or grid cells such that when positioned above a stack of containers occupying a grid space or grid cell, the lifting device is arranged to lift at least one container from said stack of containers.

\* \* \* \* \*